US011312442B2

United States Patent
Shimazu et al.

(10) Patent No.: US 11,312,442 B2
(45) Date of Patent: Apr. 26, 2022

(54) CREATION DEVICE, COMPONENT CONTROL DEVICE, CREATION METHOD, COMPONENT CONTROL METHOD, COMPUTER PROGRAM AND LEARNING MODEL

(71) Applicant: Shimano Inc., Osaka (JP)

(72) Inventors: Hayato Shimazu, Osaka (JP); Hitoshi Takayama, Osaka (JP); Satoshi Shahana, Osaka (JP); Takafumi Nishino, Osaka (JP); Takehiko Nakajima, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/453,236

(22) Filed: Jun. 26, 2019

(65) Prior Publication Data
US 2020/0010148 A1 Jan. 9, 2020

(30) Foreign Application Priority Data
Jul. 9, 2018 (JP) .............................. JP2018-130246

(51) Int. Cl.
*B62J 45/412* (2020.01)
*B62M 25/08* (2006.01)
(Continued)

(52) U.S. Cl.
CPC ......... *B62J 45/412* (2020.02); *B60R 16/0373* (2013.01); *B62J 43/13* (2020.02); *B62J 43/20* (2020.02); *B62J 43/30* (2020.02); *B62J 50/21* (2020.02); *B62M 25/08* (2013.01); *G05B 13/0265* (2013.01); *B62J 45/40* (2020.02); *B62M 6/45* (2013.01)

(58) Field of Classification Search
CPC . B62M 25/08; B62M 6/54; B62J 99/00; B62J 45/20; B62J 45/40
See application file for complete search history.

(56) References Cited

U.S. PATENT DOCUMENTS 6,047,230 A * 4/2000 Spencer ................. B62M 25/08
701/57
2018/0362114 A1* 12/2018 Lee .......................... B62M 6/45

FOREIGN PATENT DOCUMENTS

CN 106896723 A * 6/2017 ............ B62M 25/08
CN 106896723 A 6/2017
(Continued)

OTHER PUBLICATIONS

Machine translation of CN 106896723 filed Dec. 2, 2020 (Year: 2020).*
(Continued)

*Primary Examiner* — Tisha D Lewis
(74) *Attorney, Agent, or Firm* — Global IP Counselors, LLP

(57) ABSTRACT

A creation device is provided that has at least one processor operatively coupled to non-transitory computer readable storage to execute operations that includes an acquisition part and a creation part. The acquisition part acquires input information concerning traveling of a human-powered vehicle. The creation part uses a learning algorithm to create a learning model that outputs output information concerning control of the components of the human-powered vehicle based on the input information.

31 Claims, 16 Drawing Sheets

(51) Int. Cl.

| | | |
|---|---|---|
| *G05B 13/02* | (2006.01) | |
| *B60R 16/037* | (2006.01) | |
| *B62J 50/21* | (2020.01) | |
| *B62J 43/13* | (2020.01) | |
| *B62J 43/20* | (2020.01) | |
| *B62J 43/30* | (2020.01) | |
| *B62M 6/45* | (2010.01) | |
| *B62J 45/40* | (2020.01) | |

(56) References Cited

FOREIGN PATENT DOCUMENTS

| | | | | |
|---|---|---|---|---|
| JP | 2-3756 A | 1/1990 | | |
| JP | 7-127718 A | 5/1995 | | |
| JP | 2018-45350 A | 3/2018 | | |
| WO | WO-2015073791 A | * 5/2015 | ............. | B62M 6/45 |
| WO | 2016/039197 A1 | 3/2016 | | |

OTHER PUBLICATIONS

Design of an automatic shift control system with self learning ability for a bicycl, vol. 38, No. 5, 594-602, published 2015. (Year: 2021).*

* cited by examiner

| TIME INFORMATION | TRAVELING SPEED | CADENCE | TORQUE | YAW | | CONTROL DATA |
|---|---|---|---|---|---|---|
| 101 | 5.63 | 34 | 110 | 0.0001 | | 2 |
| 413 | 5.63 | 34 | 110 | 0.0000 | | 2 |
| 720 | 5.69 | 35 | 105 | 0.0000 | | 2 |
| 1028 | 5.78 | 35 | 100 | 0.0000 | | 2 |
| 1334 | 5.86 | 36 | 100 | 0.0001 | | 2 |
| 1645 | 5.89 | 34 | 125 | −0.0001 | | 3 |
| 1959 | 5.97 | 34 | 120 | 0.0000 | | 3 |
| ⋮ | ⋮ | ⋮ | ⋮ | ⋮ | | ⋮ |

FIG.8

CREATION DEVICE, COMPONENT CONTROL DEVICE, CREATION METHOD, COMPONENT CONTROL METHOD, COMPUTER PROGRAM AND LEARNING MODEL

CROSS-REFERENCE TO RELATED APPLICATIONS

This application claims priority to Japanese Patent Application No. 2018-130246, filed on Jul. 9, 2018. The entire disclosure of Japanese Patent Application No. 2018-130246 is hereby incorporated herein by reference.

BACKGROUND

Technical Field

The present invention generally relates to a creation device for creating data concerning control of the components of a human-powered vehicle, a component control device, a creation method, a component control method, a computer program and a learning model.

Background Information

Human-powered vehicles at least partially utilizing man power have been known, including a bicycle, a power-assisted bicycle, an electric bicycle called an e-bike and so on. The human-powered vehicle is provided with a multi-geared transmission device that shifts gears according to a gear shifting operation by a rider. An automatic gear shifting control system has conventionally been proposed for automatically controlling a gear shift by using sensors such as a speed sensor, a cadence sensor, a chain tension sensor and so on, and performing various computations on an output from each of the sensors (e.g., see U.S. Pat. No. 6,047,230—Patent Document 1).

SUMMARY

An automatic control aims at producing a control that closely matches a rider's intention. The automatic control of components, including the transmission disclosed in Patent Document 1 or the like, is achieved by combinations of determinations on whether or not each of the numerical values obtained from the various sensors such as a speed sensor, a torque sensor and so on mounted on the human-powered vehicle is larger than a predetermined threshold. However, determination using a threshold is insufficient for achieving desired automatic control.

An object of the present disclosure is to provide a data creation device that achieves automatic control of components that is less likely to make the rider feel uncomfortable, a component control device, a creation method, a component control method, a computer program and a learning model.

A creation device according to a first aspect of the present disclosure comprises a non-transitory computer readable storage and at least one processor. The non-transitory computer readable storage has a learning algorithm stored in the non-transitory computer readable storage. The at least one processor is operatively coupled to the non-transitory computer readable storage to execute operations. The at least one processor includes an acquisition part and a creation part. The acquisition part is configured to acquire input information concerning traveling of a human-powered vehicle. The creation part is configured to use the learning algorithm to create a learning model that outputs output information concerning control of a component of the human-powered vehicle based on the input information.

This enables component control depending on the situations where a threshold is insufficient for determination based on multiple pieces of input information including the measured values concerning traveling.

In a creation device according to a second aspect of the present disclosure, the creation device according to the above-described first aspect is configured such that the output information is at least one of a gear stage and a gear ratio for a transmission.

This enables automatic gear shifting control depending on the situations where a threshold is insufficient for determination based on multiple pieces of input information including the measured values concerning traveling.

In a creation device according to the third aspect of the present disclosure, the creation device according to the above-described first or the second aspect is configured such that the input information includes at least one of a traveling speed of the human-powered vehicle and a cadence of a crank of a driving mechanism.

This makes it possible to achieve automatic control that is less likely to make the rider feel uncomfortable.

In a creation device according to a fourth aspect of the present disclosure, the creation device according to any one of the above-described first to third aspects is configured such that the input information includes detection data of an attitude of the human-powered vehicle.

This makes it possible to achieve automatic control that is less likely to make the rider feel uncomfortable.

In a creation device according to a fifth aspect of the present disclosure, the creation device according to any one of the above-described first to fourth aspects is configured such that the input information includes detection data of a posture of a user riding on the human-powered vehicle.

This makes it possible to achieve automatic control that is less likely to make the rider feel uncomfortable.

In a creation device according to a sixth aspect of the present disclosure, the creation device according to any one of the above-described first to fifth aspects is configured such that the input information includes detection data of a traveling environment of the human-powered vehicle.

This makes it possible to achieve automatic control that is less likely to make the rider feel uncomfortable.

In a creation device according to a seventh aspect of the present disclosure, the creation device according to any one of the above-described first to sixth aspects is configured such that the acquisition part is configured to acquire input information obtained at different points in time, and the creation part is configured to input the input information obtained at the different points in time to the learning model.

Hence, the learning model that outputs output information concerning control is created based on the input information obtained at multiple points in time, which enables achievement of automatic control that is unlikely to produce discomfort.

In a creation device according to an eighth aspect of the present disclosure, the creation device according to any one of the above-described first to sixth aspects is configured such that the acquisition part is configured to acquire the input information obtained at different points in time, and the creation part is configured to input a variation of the input information to the learning model.

Hence, the learning model that outputs output information concerning control is created based on the variation of the input information obtained over multiple points in time, which enables achievement of automatic control that is unlikely to produce discomfort.

In a creation device according to a ninth aspect of the present disclosure, the creation device according to any one of the above-described first to eighth aspects is configured such that the processor further executes an operation that includes an evaluation part that evaluates output information output from the learning model, and the creation part being configured to update the learning model based on an evaluation by the evaluation part.

This makes it possible to achieve automatic control that makes the rider have less uncomfortable feeling.

In a creation device according to a tenth aspect of the present disclosure, the creation device according to the above-described ninth aspect further comprises a user operable input device configured to accept a designation operation concerning the output information, and the evaluation part being configured to make an evaluation based on checking the output information output from the learning model based on the input information acquired by the acquisition part against the designation operation accepted by the user operable input device.

This makes it possible to achieve automatic control adapted to the operation by the rider.

In a creation device according to an eleventh aspect of the present disclosure, the creation device according to the above-described tenth aspect is configured such that the evaluation part is configured to provide a low evaluation upon determining the output information output from the learning model and a detail of the designation operation do not match with each other.

This makes it possible to achieve automatic control adapted to the operation by the rider.

In a creation device according to a twelfth aspect of the present disclosure, the creation device according to the above-described tenth aspect is configured such that the creation part is configured to update the learning model by assigning a weight based on training data including the detail of the designation operation upon determining the output information output from the learning model and a detail of the designation operation do not match with each other.

This makes it possible to achieve automatic control adapted to the operation by the rider.

In a creation device according to a thirteenth aspect of the present disclosure, the creation device according to the above-described twelfth aspect is configured such that the weight is different depending on a degree of match between the output information output from the learning model and the detail of the designation operation.

Hence, if there is a large difference between an actual state and a state preferred by the rider, more intensive learning is made to thereby achieve automatic control that is unlikely to produce discomfort.

In a creation device according to a fourteenth aspect of the present disclosure, the creation device according to the above-described tenth aspect is configured such that the acquisition part is configured to temporarily store a plurality of pieces of the input information in time series one by one in the non-transitory computer readable storage, and the creation part is configured to set, upon determining acceptance of a designation operation by the user operable input device, the pieces of the input information acquired before and after a timing when the designation operation is performed as an input and updates the learning model using the input and a detail of the operation of the user operable input device.

This makes it possible to achieve automatic control that is unlikely to produce discomfort in response to changes in a traveling environment.

In a creation device according to a fifteenth aspect of the present disclosure, the creation device according to the above-described fourteenth aspect is configured such that the creation part is configured to update the learning model by increasing a number of acquisitions of the input information upon determining the designation operation is accepted by the user operable input device.

Hence, if the output of the learning model and the operation by the rider do not match with each other, intensive learning is made to thereby achieve automatic control that is unlikely to produce discomfort.

In a creation device according to a sixteenth aspect of the present disclosure, the creation device according to the above-described fourteenth aspect is configured such that the creation part is configured to update the learning model by increasing an acquisition frequency of the input information upon determining the designation operation is accepted by the user operable input device.

Hence, if the output of the learning model and the operation by the rider do not match with each other, intensive training is made to thereby achieve automatic control that is unlikely to produce discomfort.

In a creation device according to a seventeenth aspect of the present disclosure, the creation device according to the above-described ninth aspect further comprises the an evaluation acceptance part configured to accept an evaluation provided by a user for action of the component based on the output information output from the learning model, and the learning model is updated based on training data including an accepted detail of evaluation, the output information output from the learning model at a timing when a detail of the evaluation is accepted, and the input information in association with the output information.

This makes it possible to achieve automatic control suited to the preferences of the rider.

In a creation device according to an eighteenth aspect of the present disclosure, the creation device according to the above-described seventeenth aspect further comprises a user operable input device configured to accept a designation operation concerning the output information, and the evaluation acceptance part being provided at the user operable input device or near the user operable input device so as to accept an evaluation operation by the user.

This makes it possible to achieve automatic control suited to the preferences of the rider.

In a creation device according to a nineteenth aspect of the present disclosure, the creation device according to the above-described seventeenth aspect is configured such that the evaluation acceptance part includes a specification part that specifies facial expressions from a photographed image obtained by photographing a face of a user who is riding the human-powered vehicle, and that accepts an evaluation made by the user based on the facial expressions specified by the specification part.

This makes it possible to achieve automatic control suited to the preferences of the rider.

In a creation device according to a twentieth aspect of the present disclosure, the creation device according to the above-described seventeenth aspect is configured such that the evaluation acceptance part includes a voice recognition part, and accepts an evaluation by recognizing a voice of the user.

This makes it possible to achieve automatic control suited to the preferences of the rider.

In a creation device according to the twenty-first aspect of the present disclosure, the creation device according to any one of the above-described first to twentieth aspects further comprises a transmission device that transmits a created learning model.

This makes it possible to achieve automatic control that that is less likely to make the rider feel uncomfortable based on the learning model for his or her own use acquired via another device even when the learning model is held in an external device and the user rides on a different human-powered vehicle.

A component control device according to the twenty-second aspect of the present disclosure comprises: a non-transitory computer readable storage, at least one processor. The non-transitory computer readable storage has a learning model that outputs output information concerning control of a component of a human-powered vehicle based on input information concerning traveling of the human-powered vehicle. The at least one processor operatively is coupled to the non-transitory computer readable storage to execute operations including an acquisition part and a control part. The acquisition part is configured to acquire the input information. The control part is configured to control the component based on output information output from the learning model by inputting the input information acquired by the acquisition part to the learning model.

This enables component control depending on the situations where a threshold is insufficient for determination based on multiple pieces of input information including the measured values concerning traveling.

In a component control device according to the twenty-third aspect of the present disclosure, the component control device according to the above-described twenty-second aspect is configured such that the output information is at least one of a gear stage and a gear ratio for a transmission.

This makes it possible to achieve automatic gear shifting control that is less likely to make the rider feel uncomfortable.

In a component control device according to the twenty-fourth aspect of the present disclosure, the component control device according to the above-described twenty-third aspect further comprises a user operable input device configured to accept a designation operation of at least one of a gear stage and a gear ratio for the transmission. The acquisition part is configured to temporarily store the pieces of the input information in time series one by one in the non-transitory computer readable storage. Upon determining acceptance of a designation operation by the user operable input device, the pieces of the input information acquired before and after a timing when the designation operation is performed is read out from the non-transitory computer readable storage so as to be set as input data, and the learning model is updated based on training data including the input data and at least one of a gear stage and a gear ratio designated by the operation of the user operable input device.

This makes it possible to achieve automatic gear shifting control that is less likely to make the rider feel uncomfortable.

In a component control device according to the twenty-fifth aspect of the present disclosure, the component control device according to the above-described twenty-second aspect further comprises an operation input device configured to accept a designation operation concerning the output information. The acquisition part is configured to temporarily store a plurality of pieces of the input information in time series one by one in non-transitory computer readable storage. Upon determining acceptance of the designation operation by the user operable input device, the pieces of the input information acquired before and after a timing when the designation operation is performed is read out from the non-transitory computer readable storage so as to be set as input data, and the learning model is updated based on training data including the input data and the output information designated by the operation of the user operable input device.

This makes it possible to achieve automatic control that is less likely to make the rider feel uncomfortable.

A component control device according to the twenty-sixth aspect of the present disclosure, the component control device according to the above-described twenty-second aspect further comprises a user operable input device configured to accept a designation operation concerning the output information, and the learning model being started to be updated upon determining an operation is accepted by the operation input device.

This makes it possible to achieve automatic control that is less likely to make the rider feel uncomfortable.

In a component control device according to the twenty-seventh aspect of the present disclosure, the component control device according to the above-described twenty-sixth aspect is configured such that update of the learning model is stopped after a predetermined time has elapsed.

This makes it possible to achieve automatic control that is less likely to make the rider feel uncomfortable.

In a component control device according to the twenty-eighth aspect of the present disclosure, the component control device according to the above-described twenty-second aspect further comprises an evaluation acceptance part configured to accept an evaluation of a detail of control performed by the control part. The acquisition part is configured to temporarily store a plurality of pieces of the input information in time series one by one in the non-transitory computer readable storage. Upon determining acceptance of an evaluation by the evaluation acceptance part, the pieces of the input information acquired before and after a timing when the evaluation is accepted by the evaluation acceptance part is read out from the non-transitory computer readable storage so as to be set as input data, and the learning model is updated based on training data including the input data and the evaluation accepted by the evaluation acceptance part.

This makes it possible to achieve automatic control that is less likely to make the rider feel uncomfortable.

In a component control device according to the twenty-ninth aspect of the present disclosure, the component control device according to the above-described twenty-eighth aspect is configured such that the learning model is started to be updated upon determining an evaluation is accepted by the evaluation acceptance part.

This makes it possible to achieve automatic control that is less likely to make the rider feel uncomfortable.

In a component control device according to the thirtieth aspect of the present disclosure, the component control device according to the above-described twenty-ninth aspect is configured such that the learning model is stopped being updated after a predetermined time has elapsed.

This makes it possible to achieve automatic control that is less likely to make the rider feel uncomfortable.

In a component control device according to the thirty-first aspect of the present disclosure, the component control device according to the above-described twenty-ninth aspect is configured such that the learning model is stopped being updated upon determining the evaluation accepted by the evaluation acceptance part is higher than a predetermined value.

This makes it possible to achieve automatic control that is less likely to make the rider feel uncomfortable.

A creation method according to the thirty-second aspect of the present disclosure comprises: acquiring input information concerning traveling of a human-powered vehicle; and creating a learning model that outputs output information concerning control of a component of the human-powered vehicle based on the acquired input information.

This enables component control depending on the situations where a threshold is insufficient for determination based on multiple pieces of input information including the measured values concerning traveling.

A component control method according to the thirty-third aspect of the present disclosure comprises acquiring input information concerning traveling of a human-powered vehicle; specifying output information output from a learning model by inputting the acquired input information to the learning model, the learning model being created by a learning algorithm in order to output information concerning control of a component of the human-powered vehicle based on the input information; and controlling the component based on the specified output information.

This enables component control depending on the situations where a threshold is insufficient for determination based on multiple pieces of input information including the measured values concerning traveling.

A computer program product according to the thirty-fourth aspect of the present disclosure is disposed upon a non-transitory computer readable storage medium. The computer program product comprises computer program instructions that, when executed by a computer, cause the computer to execute processing of acquiring input information concerning traveling of a human-powered vehicle; and creating a learning model that outputs output information concerning control of a component of the human-powered vehicle based on the acquired input information.

This enables component control depending on the situations where a threshold is insufficient for determination based on multiple pieces of input information including the measured values concerning traveling.

A non-transitory computer learning model according to the thirty-fifth aspect of the present disclosure is disposed upon a non-transitory computer readable storage medium and executable by a processor. The non-transitory computer learning model comprises an input layer to which input information concerning traveling of a human-powered vehicle is input; an output layer from which output information concerning control of a component of the human-powered vehicle is output; and an intermediate layer that is trained based on training data including a detail of operation accepted by a user operable input device that accepts designation operation concerning the output information, and the learning model being used for processing of acquiring input information and applying the input information to the input layer, performing a computation based on the intermediate layer, and outputting the output information corresponding to the input information from the output layer.

This enables component control depending on the situations where a threshold is insufficient for determination based on multiple pieces of input information including the measured values concerning traveling.

In a learning model according to the thirty-sixth aspect of the present disclosure, the learning model according to the above-described thirty-fifth aspect further comprises the intermediate layer is trained with a parameter including at least one of weight and bias by the training data and is used for performing a computation according to a parameter in the intermediate layer.

This enables component control depending on the situations where a threshold is insufficient for determination based on multiple pieces of input information including the measured values concerning traveling.

According to the creation device of data concerning control of a human-powered vehicle, the component control device, the creation method, the component control method, the computer program and the learning model according to the present disclosure, automatic control of the components that is less likely to make the rider feel uncomfortable is achieved.

BRIEF DESCRIPTION OF THE DRAWINGS

Referring now to the attached drawings which form a part of this original disclosure.

FIG. 8 is one example of the contents of input information stored in a storage of the controller and the outline of training.

DETAILED DESCRIPTION OF EMBODIMENT

The descriptions of the embodiments below are examples of forms that a creation device and a component control device according to the present invention can take, though there is no intention to limit the forms. The creation device, the component control device, a creation method, a component control method, a computer program and a learning model according to the present invention can take forms different from the embodiments, such as forms of modification of each of the embodiments and a combination of at least two or more modifications that do not contradict each other. The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

In the following description of each of the embodiments, the terms indicating directions, such as front, rear, forward, backward, left, right, sideways, upper, lower and so on are used with reference to the directions seen as the user sits in the saddle of a human-powered vehicle.

First Embodiment

Figure 1:
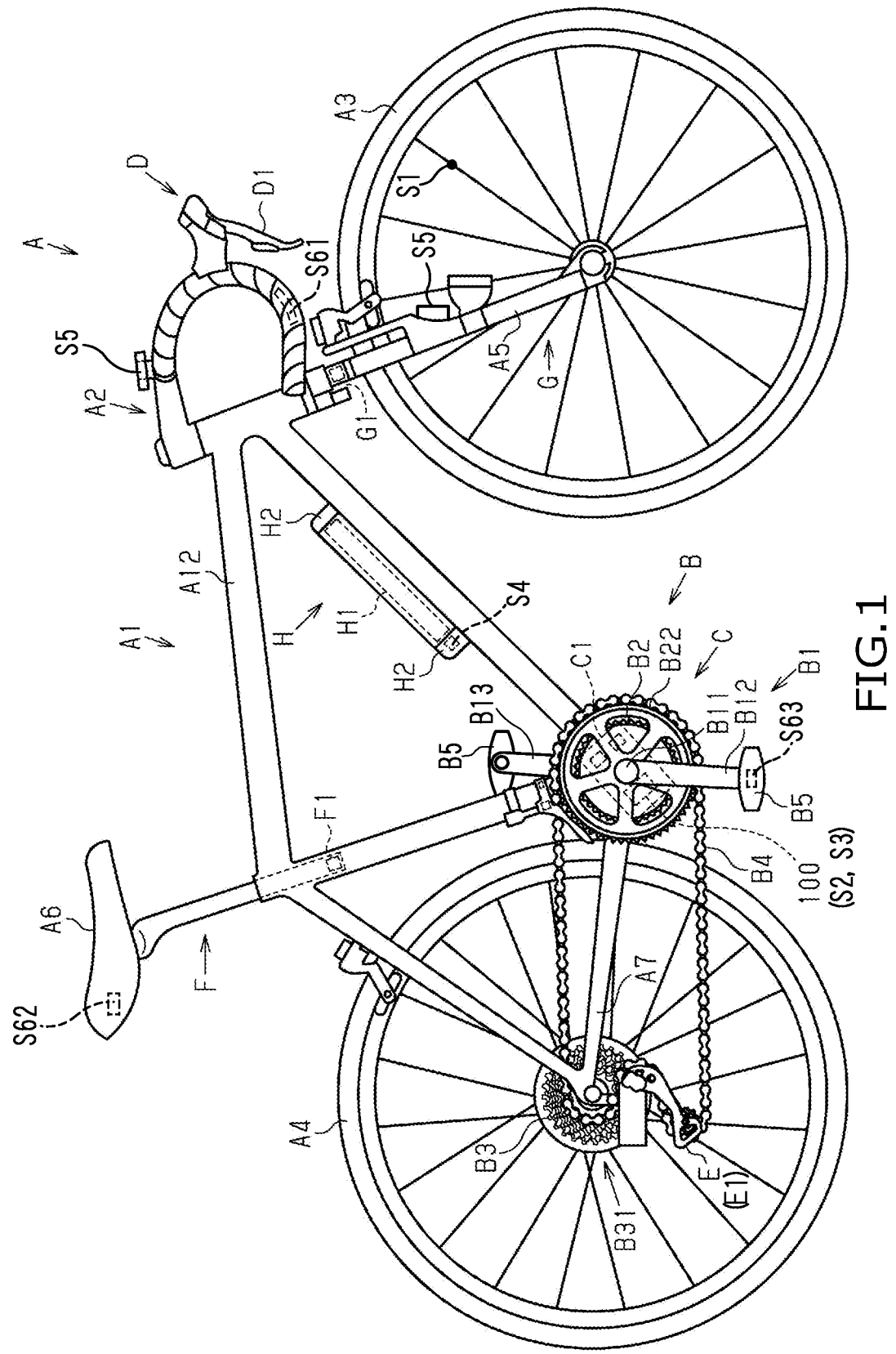
FIG. 1 is a side elevational view of a bicycle to which creation devices or component control devices are applied according to first to fourth embodiments.

FIG. 1 is a side view of a human-powered vehicle A to which a creation device 1 according to a first embodiment is applied. The human-powered vehicle A is a road bike including an assist mechanism C that assists in the propulsion of the human-powered vehicle A using electric energy. The configuration of the human-powered vehicle A can arbitrarily be changed. In the first example, the human-powered vehicle A does not include the assist mechanism C. In the second example, the kind of the human-powered vehicle A is a utility bicycle, a mountain bicycle or a hybrid bicycle. In the third example, the human-powered vehicle A includes the features of the first example and the second example.

The human-powered vehicle A is provided with a main body A1, a handlebar A2, a front wheel A3, a rear wheel A4, a front fork A5, a saddle A6 and a derailleur hanger A7. The human-powered vehicle A includes a driving mechanism B, an assist mechanism C, a plurality of user operable input devices D (only one shown in FIG. 1), a transmission E, an electric seat post F, an electric suspension G, a battery unit H and a controller 100. The human-powered vehicle A includes a speed sensor S1, a cadence sensor S2, a torque sensor S3, a gyro sensor S4, an image sensor S5 and posture sensors S61, S62 and S63. The main body A1 is provided with a frame A12.

The driving mechanism B transmits human-powered drive force to the rear wheel A4 by a chain drive, a belt drive or a shaft drive. FIG. 1 illustrates the driving mechanism B of the chain drive. The driving mechanism B includes a crank B1, a first sprocket assembly B2, a second sprocket assembly B3, a chain B4 and a pair of pedals B5.

The crank B1 includes a crank shaft B11, a right crank B12 and a left crank B13. The crank shaft B11 is rotatably supported to the assist mechanism C mounted on the frame A12. The right crank B12 and the left crank B13 are respectively coupled to the crank shaft B11. One of the pair of pedals B5 is rotatably supported to the right crank B12. The other of the pair of pedals B5 is rotatably supported to the left crank B13.

The first sprocket assembly B2 has a first rotative central axis and is coupled to the crank shaft B11 so as to allow for unitary rotation. The first sprocket assembly B2 includes one or more sprockets B22. The crank shaft B11 and the first sprocket assembly B2 are coaxial with each other. As one example, the first sprocket assembly B2 includes multiple sprockets B22 different in outer diameters. As one example, the multiple sprockets B22 are made larger in outer diameter and larger in the number of gear stages as they are outwardly away from the main body A1.

The second sprocket assembly B3 has a second rotative central axis and is rotatably supported to a hub (not illustrated) of the rear wheel A4. The second sprocket assembly B3 includes one or more sprockets B31. As one example, the second sprocket assembly B3 includes multiple sprockets B31 different in outer diameters. As one example, the multiple sprockets B31 are made smaller in outer diameter and larger in the number of gear stages as they are outwardly away from the rear wheel A4.

The chain B4 is entrained about any one of the sprockets B22 of the first sprocket assembly B2 and any one of the sprockets B31 of the second sprocket assembly B3. When the crank B1 rotates forwardly by a human-powered drive force applied to the pair of pedals B5, the first sprocket assembly B2 rotates forwardly together with the crank B1, which transmits the rotation of the first sprocket assembly B2 to the second sprocket assembly B3 via the chain B4 to thereby rotate forwardly the rear wheel A4.

The assist mechanism C includes an electric actuator C1. The assist mechanism C assists the propulsion of the human-powered vehicle A. As one example, the assist mechanism C transmits a torque to the first sprocket assembly B2 to thereby assist the propulsion of the human-powered vehicle A. The electric actuator C1 includes an electric motor, for example. The electric actuator C1 can include a reducer. The electric actuator C1 includes the chain B4 that runs for transmitting a driving force to the rear wheel A4 of the human-powered vehicle A. The assist mechanism C is a part of the components that can be controlled by a signal for assisting the running of the chain B4.

Each of the user operable input devices D includes a user operated part D1 to be operated by the user. The user operable input device D is not limited to the one illustrated FIG. 1, and can include, for example, a button, a switch, a lever, a dial and/or a touch screen. One example of the user operated part D1 is one or more buttons. Another example of the user operated part D1 is a dual brake-shift lever as shown in FIG. 1 for operating a brake device and the transmission E. The dual brake-shift levers are provided at left and right ends of the handlebar A2. The dual brake-shift levers are moved to be inclined sideways, such that a gear stage or a gear ratio for the transmission E can be changed. In addition, the user operable input devices D accept a designation operation concerning control of various components such as mode switching of the assist mechanism C (power-saving mode, high-power mode, etc.), operation switching of the electric seat post F, operation switching of the electric suspension G and so on. The user operable input devices D are connected to communicate with each of the components so as to transmit a signal according to an operation performed on the user operated part D1 to the transmission E or the other components. In the first example, one of the user operable input devices D is connected to communicate with the transmission E through a communication line or an electric wire that allows for power line communication (PLC). In the second example, one of the user operable input devices D is connected to communicate with the transmission E and the other components by a wireless communication unit that allows for wireless communication. In the case where the user operated part D1 is operated, a control signal for shifting the gear stage of the transmission E is transmitted to the transmission E, and in response to the signal, the transmission E operates to shift the gear stage in the first example. The control signal includes, for example, an INWARD signal indicating a shift to the inner sprocket B31 and an OUTWARD signal indicating a shift to the external sprocket B31, for example. Each of the signals can include the gear stage of the sprocket B31 to be shifted. Shifting of two stages or more at a time can also be possible.

The transmission E can take various forms. In the first example, the transmission E is an external transmission for shifting a coupled state between the second sprocket assembly B3 and the chain B4. Specifically, by shifting the sprocket B31 to be coupled to the chain B4, the transmission E changes a ratio of the number of rotations of the rear wheel A4 to the number of rotations of the crank B1, that is, the gear ratio of the human-powered vehicle A. The transmission E activates the electric actuator E1 to move the chain B4 according to the selected gear stage to thereby change the gear ratio. More specifically, the transmission E in the first example is attached to the derailleur hanger A7 of the human-powered vehicle A. In the second example, the transmission E is an external transmission for shifting a coupled state between the first sprocket assembly B2 and the chain B4. Specifically, by shifting the sprocket B22 to be coupled to the chain B4, the transmission E changes a ratio of the number of rotations of the rear wheel A4 to the number of rotations of the crank B1, that is, the gear ratio of the human-powered vehicle A. In the third example, the transmission E is an internal transmission. In the third example, the movable part of the transmission E includes at least one of a sleeve and a claw of the internal transmission. In the fourth example, the transmission E is a continuously variable transmission. In the fourth example, the movable part of the transmission E includes a ball planetary of the continuously variable transmission. The transmission E is a part of the components that can be controlled by a signal for shifting a gear stage.

The electric seat post F is attached to the frame A12. The electric seat post F includes an electric actuator F1. The electric actuator F1 causes the saddle A6 to rise or fall relative to the frame A12. The electric actuator F1 is an electric motor, for example. The electric seat post F is a part of the components that can be controlled by setting a supported position of the saddle A6 relative to the frame A12 as an operation parameter. The saddle A6 can be supported at one or more supported positions.

The electric suspension G can take various forms. In the first embodiment, the electric suspension G, which is provided at the front fork A5, is a front suspension for damping the shock applied to the front wheel A3. The electric suspension G includes an electric actuator G1. The electric actuator G1 is an electric motor, for example. The electric suspension G is a part of the components that can be controlled by setting a damping factor, a stroke amount and a locked out state as operation parameters. The electric suspension G can change the operation parameters by driving the electric actuator G1. The electric suspension G can be a rear suspension for damping the shock applied to the rear wheel A4.

The battery unit H includes a battery H1 and a battery holder H2. The battery H1 is a rechargeable battery including one or more battery cells. The battery holder H2 is fixed at the frame A12 of the human-powered vehicle A. The battery H1 can be attached to and detached from the battery holder H2. When attached to the battery holder H2, the battery H1 is electrically connected to at least the electric actuator E1 of the transmission E, the electric actuator C1 of the assist mechanism C and the controller 100. The battery H1 can also be electrically connected to the electric actuator F1 of the electric seat post F and the electric actuator G1 of the electric suspension G.

The speed sensor S1 is fixed at the frame A12. The speed sensor S1 is a sensor for outputting a signal indicating the traveling speed of the human-powered vehicle A. The speed sensor S1, which includes a magnet provided at the front wheel A3 and a main body provided at the front fork A5 for detecting the magnet, for example, measures a rotation speed.

The cadence sensor S2 is provided so as to measure a cadence of any one of the right crank B12 and the left crank B13. The cadence sensor S2 outputs a signal indicating the measured cadence. The torque sensor S3 is provided so as to respectively measure torques applied to the right crank B12 and the left crank B13. The torque sensor S3 outputs a signal indicating the torque measured at least one of the right crank B12 and the left crank B13.

The gyro sensor S4 is fixed at the frame A12. The gyro sensor S4 is a sensor for outputting signals respectively indicating yaw, roll and pitch of the human-powered vehicle A. The gyro sensor S4 can output a signal indicating at least any one of the three axes, not limited to all the three axes.

The image sensor S5 is provided on the frame A12 so as to face the front. In the first example, the image sensor S5 is mounted on the front fork A5 together with a light so as to face the front. In the second example, it is mounted on the handlebar A2. The image sensor S5 outputs a video corresponding to the user's field of vision by using a camera module. The image sensor S5 outputs a video signal obtained by photographing an object present in the direction of travel. The image sensor S5 can be a module that is integrally equipped with an image recognition unit for performing recognition processing of separately recognizing a road, a building and another running vehicle from the video and that outputs a recognition result.

The posture sensors S61, S62 and S63 are piezoelectric sensors, for example. The posture sensors S61, S62 and S63 are provided at a portion of the human-powered vehicle A where the weight of the user is applied. The posture sensors S61 are provided at both of the handles, for example. The posture sensors S62 are provided at one or more positions of the saddle A6 along the surface thereof. The posture sensors S63 are provided at both of the pair of pedals B5 of the crank B1. The posture sensors S61, S62 and S63 each output a signal responsive to the applied weight. In place of the posture sensors S61, S62 and S63 or in addition thereto, a gyro sensor can be attached to the helmet for detecting the posture of the user.

Figure 2:
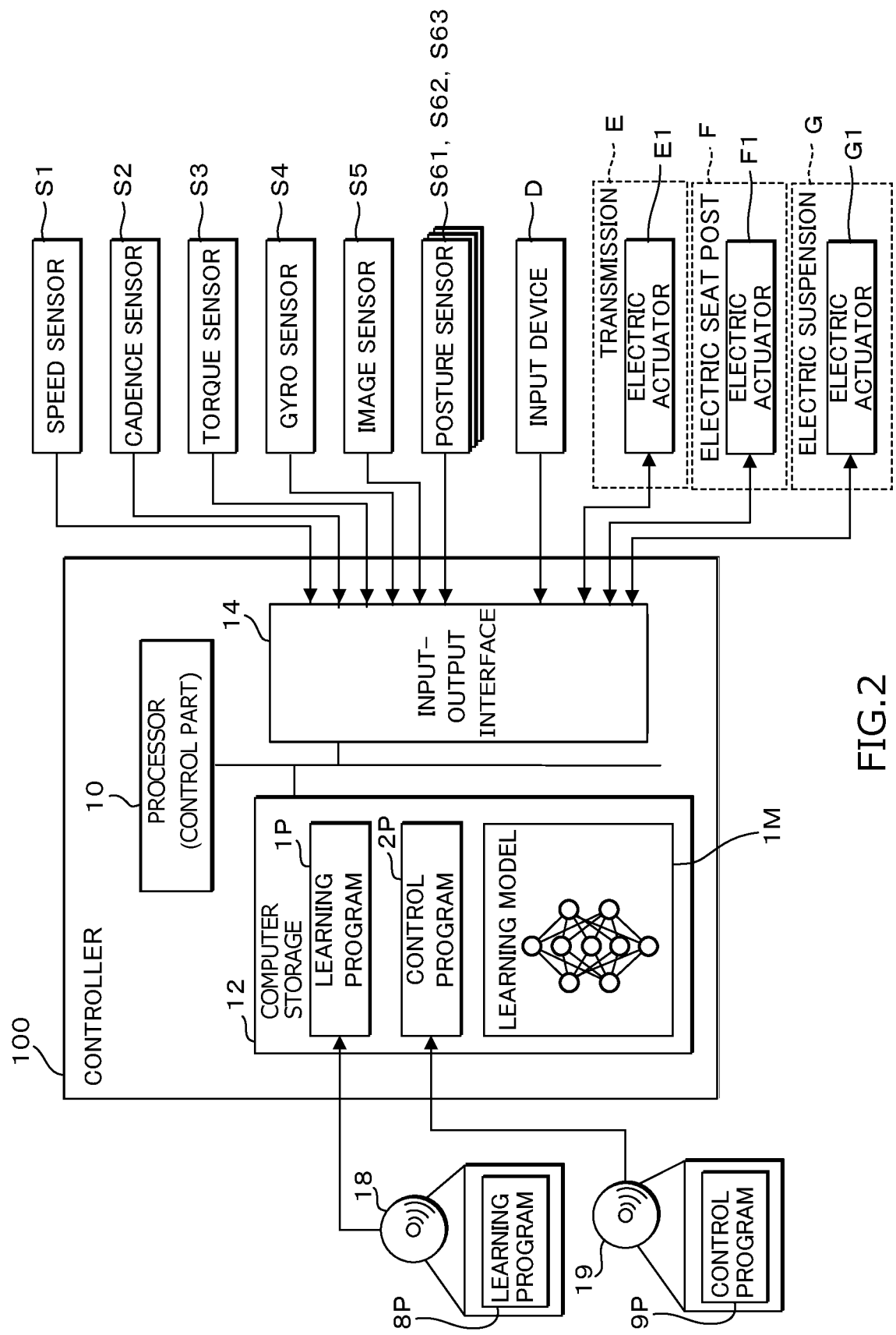
FIG. 2 is a block diagram schematically illustrating a bicycle component control system and schematically illustrating an internal configuration of a controller.

FIG. 2 is a block diagram illustrating the internal configuration of the controller 100. The controller 100 is preferably an electronic controller or a microcomputer that includes one or more processors and one or more computer storage devices (i.e., computer memory devices). The controller 100 is formed of one or more semiconductor chips that are mounted on a printed circuit board. The terms "controller" and "electronic controller" as used herein refer to hardware that executes a software program, and does not include a human. The controller 100 includes a processor 10, a storage 12 and an input-output interface 14. The controller 100 is provided at any position of the frame A12. In the first example as illustrated in FIG. 1, the controller 100 is provided between the first sprocket assembly B2 and the frame A12. In the second example, the controller 100 is provided in the battery holder H2.

The processor 10 is a computer processor utilizing a central processing unit (CPU) or a graphics processing unit (GPU), and executes processing by controlling a learning algorithm described later and the components provided in the human-powered vehicle A using a memory such as a built-in read only memory (ROM), a random access memory (RAM) and so on. The processor 10 acquires time information at an arbitrary timing by using an internal clock.

The storage 12 is any computer storage device or any non-transitory computer-readable medium with the sole exception of a transitory, propagating signal. In other words, the term "storage" as used herein refers to a non-transitory computer readable storage. The storage 12 includes a non-volatile memory such as a flash memory, a hard disk, a ROM (Read Only Memory) device, and so on, for example. Also, for example, the storage 12 can also include volatile memory such as a RAM (Random Access Memory) device. The storage 12 stores a learning program 1P and a control program 2P. The learning program 1P can be included in the control program 2P. The storage 12 stores a learning model 1M created by the processing performed by the processor 10. The learning program 1P can be obtained by reading out a learning program 8P stored in a recording medium 18 and copying it in the storage 12. The control program 2P can be obtained by reading out a control program 9P stored in a storage medium 19 and copying it in the storage 12.

The input-output interface 14 is connected to at least sensor groups S1-S5 and S61-S63, the user operable input devices D and the electric actuator E1 to be controlled that are mounted on the human-powered vehicle A. The input-output interface 14 is also connected to the electric actuators F1 and G1 to be controlled. The processor 10 receives an input of a signal indicative of speed or a cadence from any one of the speed sensor S1 or the cadence sensor S2 through the input-output interface 14. The processor 10 receives an input of a signal indicative of an attitude of the human-powered vehicle A, specifically, a signal indicative of yaw, roll or pitch from the gyro sensor S4. The processor 10 receives an input of a signal indicative of a posture of the user, specifically, a signal indicative of weight distribution from the posture sensors S61, S62 and S63. The processor 10 performs processing utilizing the information acquired from these sensor groups S1-S5 and S61-S63 as input information. The processor 10 receives a signal from the user operable input devices D through the input-output interface 14. In the block diagram illustrated in FIG. 2, the input-output interface 14 is connected to the electric actuator F1 and the electric actuator G1, though it does not need to be connected to the electric actuator F1 and the electric actuator G1 if these actuators F1 and G1 are not to be controlled.

The controller 100 operates in a learning mode and an automatic control mode. The processor 10 functions as a creation part that creates a learning model 1M using a learning algorithm of the deep learning based on the learning program 1P if operated in the learning mode. In the learning mode, the controller 100 corresponds to a "creation device." The processor 10 functions as a control part that controls components including the transmission E according to the control program 2P based on output information output from the learning model 1M in response to an input of the input information acquired from the input-output interface 14 to the learning model 1M if operated in the automatic control mode. In the automatic control mode, the controller 100 corresponds to a "component control device."

Figure 3:
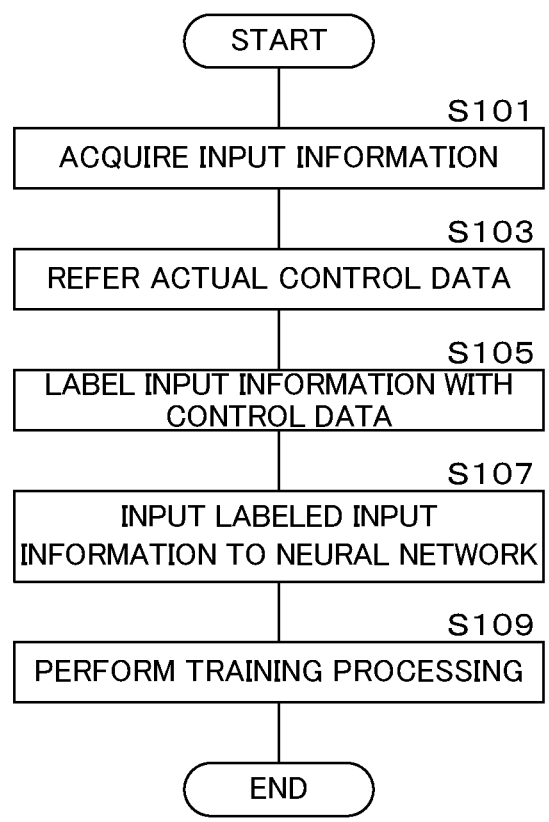
FIG. 3 is a flowchart depicting one example of a processing procedure in a learning mode performed by a processor of the controller.

First, the operation of the controller 100 under the learning mode will be described. FIG. 3 is a flowchart depicting one example of a processing procedure in the learning mode performed by the processor 10. The learning algorithm in the present embodiment is supervised deep learning using a neural network (hereinafter referred to as NN). The learning algorithm can be an unsupervised learning algorithm, or can be a recurrent neural network. The learning algorithm can be for reinforcement learning. The processor 10 repeatedly executes the processing procedure in the flowchart illustrated in FIG. 3 during the learning mode every predetermined sampling period (30 milliseconds, for example) for each component to be controlled.

The processor 10 acquires input information concerning traveling of the human-powered vehicle A by the input-output interface 14 (step S101). At step S101, the processor 10 corresponds to an "acquisition part." At step S101, the processor 10 specifically refers to each of the signal levels from the sensor groups S1-S5 and S61-S63 input through the input-output interface 14 every sampling period depending on the sensors, and temporarily stores the signal level in the internal memory of the processor 10 or a memory integrated in the input-output interface 14. The sampling period for each sensor can be the same as or different from the predetermined sampling period.

At step S101, the processor 10 does not need to input all the pieces of information that can be acquired by the input-output interface 14 as will be described later. The processor 10 can acquire only a traveling speed and a cadence. The processor 10 can perform pre-processing such as discrimination, extraction, computation, etc. on the input information that can be acquired.

A control part of the processor 10 refers to actual control data of an object to be controlled corresponding to the input information acquired at step S101 (step S103). The control data is details of the operation accepted by the user operated part D1. The processor 10 refers to a gear stage or a gear ratio for the transmission E, for example, at step S103. In this case, the processor 10 can recognize the gear stage based on a signal from the user operable input device D or can recognize the current gear stage with reference to the information fed back from the transmission E. The control data corresponding to the input information referred to at step S103 can be a state a predetermined time (10 milliseconds, 50 milliseconds, 100 milliseconds, 1 second, for example) after the input information is input.

The processor 10 labels the input information acquired at step S101 with the control data referred to at step S103 to thereby create training data (step S105) and inputs the labeled input information to an NN 13 (see FIG. 4) (step S107). The processor 10 performs training processing for training parameters including at least one of weights and biases in the intermediate layer of the NN 13 (step S109). The processor 10 ends the training based on the input information for one sampling timing after execution of the training processing.

Creation of the learning model 1M is not limited to the supervised learning method in which control data concerning actual control is labeled as described above. The learning model 1M can be created based on the NN 13 from which output information concerning control is output as numerical values. The processor 10 can train the learning model 1M using parameters in the intermediate layer 133 (see FIG. 4) with the use of an error propagation method by calculating an error based on actual control data. Using the NN 13 that outputs the gear stage for the transmission E as a numerical value, for example, an error between the output gear stage and the actual gear stage is calculated, and at least one of the weight and bias in the intermediate layer 133 can be trained while the calculated error is propagated. Furthermore, using the NN 13 created in advance in such a manner that input information labeled with a gear stage or a gear ratio are accumulated and given as an initial state, the processor 10 can perform training such that the error between the gear stage or gear ratio output from the NN 13 and the actual gear stage or gear ratio is minimized by error propagation by utilizing the error propagation method. As will be described later, the processor 10 can perform training by reinforcement learning that advances the training by providing an evaluation based on a comparison between the output information concerning control and the actual control data.

Figure 4:
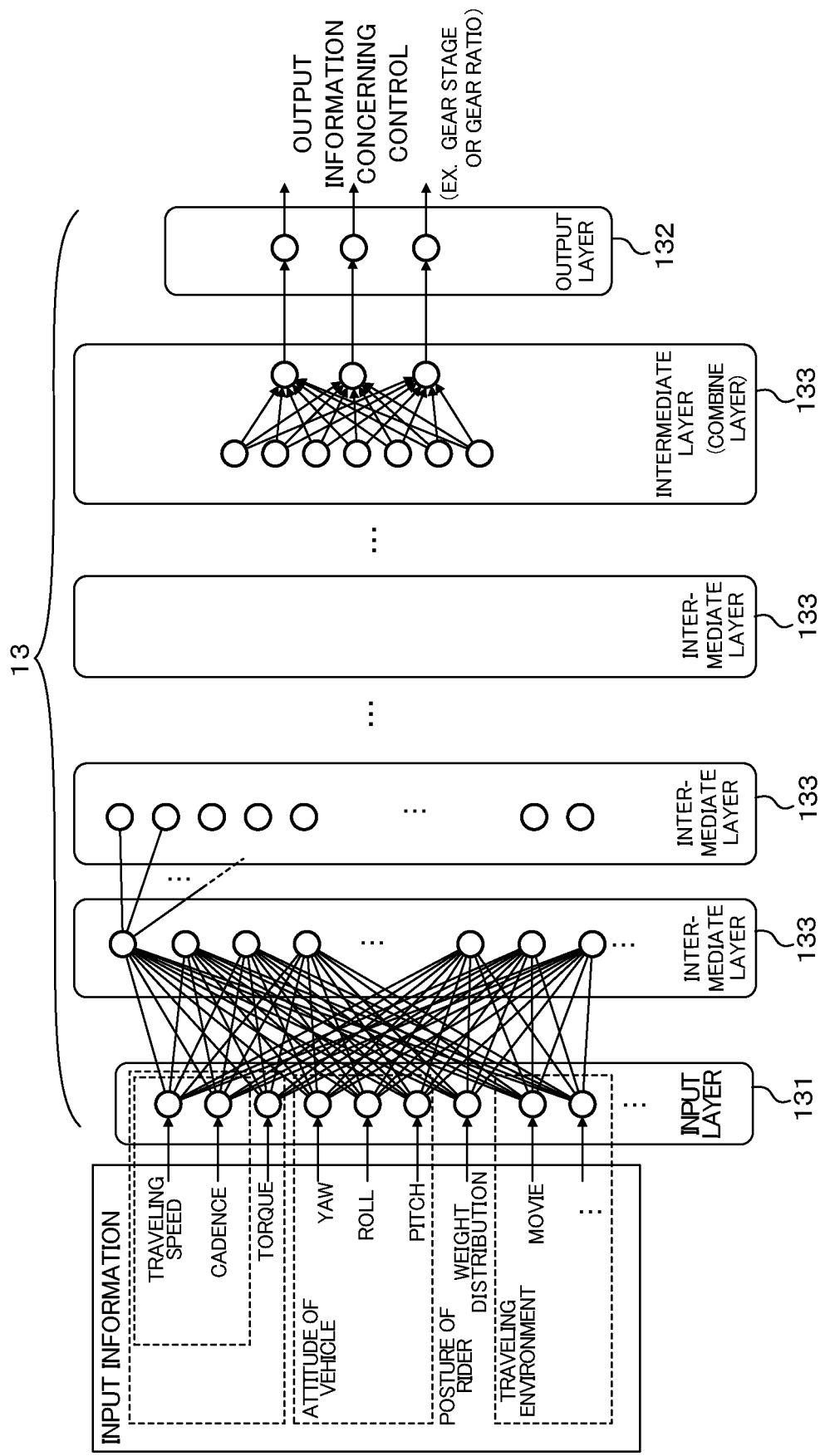
FIG. 4 illustrates one example of a learning model to be created by the processor of the controller using a learning algorithm.

By repetitively executing the training processing illustrated in the flowchart of FIG. 3, the NN 13 is changed to the learning model 1M that outputs output information concerning control of the components of the human-powered vehicle A based on the input information concerning running of the human-powered vehicle A. FIG. 4 illustrates one example of the learning model 1M to be created. The learning model 1M includes an input layer 131 to which input information concerning traveling of the human-powered vehicle A acquired from the sensor groups S1-S5 and S61-S63 is input and an output layer 132 from which output information concerning control of the component of the human-powered vehicle A is output. The learning model 1M includes an intermediate layer 133, which is located between the input layer 131 and the output layer 132, includes a group of nodes formed by one or more layers and performs training based on training data including the details of the operation accepted by the user operated part D1 concerning the output information. As illustrated in FIG. 4, the intermediate layer 133 is connected to the output layer 132 is a connected layer for aggregating the multiple nodes into the number of nodes in the output layer 132. Three nodes are found in the output layer 132 in the example in FIG. 4, though any number can be taken. The nodes of the intermediate layer 133 each have a parameter including at least one of the weight and the bias in association with the node in the previous layer. The processor 10 creates training data by labeling input information with actual control data corresponding to the input information based on the learning program 1P. The processor 10 inputs the created training data to the input layer 131, so that the parameters in the intermediate layer 133 are each trained.

With reference to FIG. 4, the learning model 1M will specifically be described. In the illustrated example, the learning model 1M from which output information concerning control of a gear stage or a gear ratio for the transmission E is output will be described. As illustrated in FIG. 4, information concerning a traveling speed obtained from the speed sensor S1 is input to the input layer 131. The traveling speed is speed per hour, for example. The traveling speed can be the number of rotations of the front wheel A3 or the rear wheel A4 per unit time. A cadence obtained from the cadence sensor S2 is input to the input layer 131. At least one of the traveling speed and the cadence is input to the input layer 131. A torque obtained from the torque sensor S3 can be input to the input layer 131. Power obtained by computation using the torque and the cadence can be input to the input layer 131.

Detection data of the attitude of the human-powered vehicle A obtained from the gyro sensor S4 is input to the input layer 131. The detection data is information indicating the inclination of the human-powered vehicle A. The inclination is represented by a yaw component having an axis in the vertical direction, a roll component having an axis in the forward and backward direction of the human-powered vehicle A and a pitch component having an axis in the right and left direction of the human-powered vehicle A.

A video signal obtained from the image sensor S5 is input to the input layer 131. The video signal obtained from the image sensor S5 is a video signal corresponding to the user's field of vision, that is, data obtained by detecting a traveling environment. In the first example, the input video signal is each of the successive multiple frame images. In the second example, the input video signal is multiple pieces of data obtained by performing various filter processing on a frame image. In the third example, the input video signal is information indicating the kind of an object present in the direction of travel recognized by the image recognition device based on the video from the image sensor S5. The distance from the object present in the direction of travel can be included. The distance can be a distance obtained according to the image processing by the image recognition device or data obtained by a radar that had been mounted on the human-powered vehicle A.

Another example of the detection data for a traveling environment is time data, weather data, luminance intensity data or humidity data. The time data is, for example, a time measured by an internal timer of the processor 10. The weather data is, for example, at least one of localized rainfall amounts, humidity, the velocity of wind and the direction of wind in the place where the human-powered vehicle A is traveling that can be acquired from an external server handling weather data. The humidity data can be obtained from a humidity sensor mounted on the main body A1 of the human-powered vehicle A. The luminance intensity data is obtained by provision of a luminance intensity sensor at any position of the main body A1 of the human-powered vehicle A, for example, at the handlebar A2.

Detection data of the user's posture obtained from each of the posture sensors S61, S62 and S63 is input to the input layer 131. The detection data is weight distribution data, for example. The posture sensors S61, S62 and S63 in the present embodiment are piezoelectric sensors. In the first example, signals output from the posture sensors S61, S62 and S63 are input to the input layer 131. In the second example, the processor 10 determines whether the rider is in a basic posture, a forwardly-tilted posture or is standing on pedals and inputs the discrimination result to the input layer 131.

All the pieces of information that can be input from the sensor groups S1-S5 and S61-S63 do not need to be input to the input layer 131. At least one of the traveling speed and the cadence is input to the input layer 131. In addition, thereto, any one or a combination of pieces of information other than the traveling speed and the cadence can be input to the input layer 131. As indicated by dotted lines in FIG. 4, the input information can be divided into groups, and for each group, the input information can be input to a different NN 13. In such a case, output information concerning control is output for each group.

The output layer 132 outputs output information including at least one of a gear stage and a gear ratio for the transmission E. More specifically, the output layer 132 outputs probabilities respectively corresponding to the nodes of the gear stage and the gear ratio. This allows the processor 10 to select the gear stage with the highest probability.

By such training processing, the learning model 1M is created that outputs output information suitable for the way of riding by the user depending on the various input information.

Figure 5:
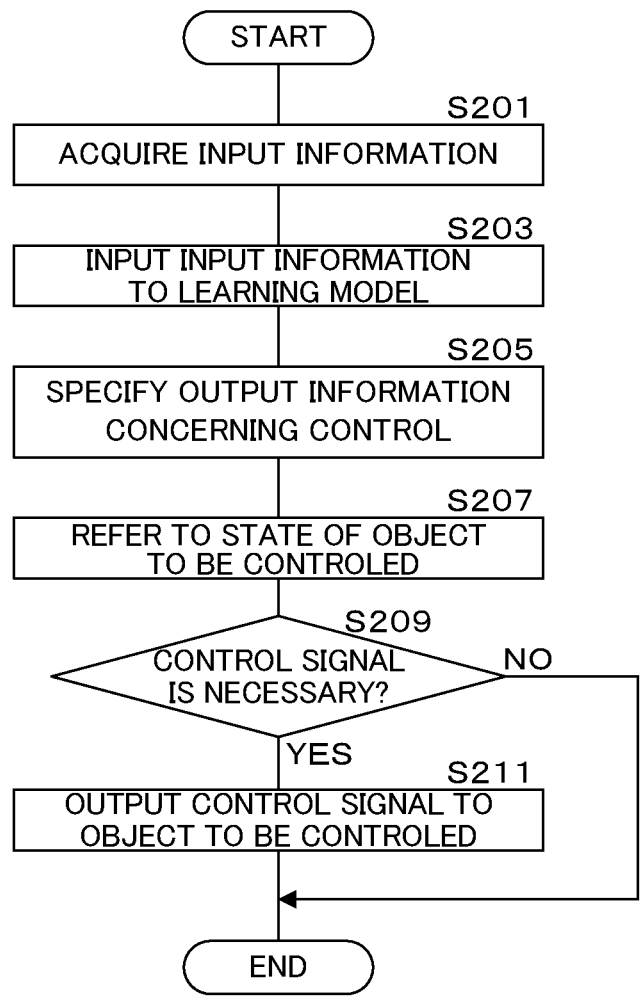
FIG. 5 is a flowchart depicting one example of a processing procedure in an automatic control mode performed by the processor of the controller.

Secondly, the operation of the controller 100 under the automatic control mode will be described. FIG. 5 is a flowchart depicting one example of a processing procedure in the automatic control mode performed by the processor 10. The processor 10 repeatedly executes the processing procedure illustrated in the flowchart in FIG. 5 during the automatic control mode. The processing procedure can be executed for each predetermined control period (30 milliseconds, for example).

The processor 10 acquires input information concerning traveling of the human-powered vehicle A through the input-output interface 14 (step S201). The processor 10 corresponds to an "acquisition part" of a "component control device" at step S201. At step S201, the control part of the processor 10 refers to the signal levels from the sensor groups S1-S5 and S61-S63 input through the input-output interface 14 every control period, and temporarily stores them in the internal memory of the processor 10 or the memory integrated in the input-output interface 14.

The processor 10 inputs the input information acquired at step S201 to the input layer 131 of the learning model 1M (step S203).

The processor 10 specifies the output information concerning control of the component to be controlled that is to be output from the learning model 1M (step S205). The processor 10 specifies a result of discrimination between a gear stage and a gear ratio for the transmission E as output information at step S205.

The control part of the processor 10 refers to the state of the object to be controlled based on the specified output information (step S207). The processor 10 determines whether or not an output of a control signal is necessary based on the relation between the details of the control indicated by the specified output information and the state that has been referred to (step S209).

If determining that an output of a control signal is necessary at step S209 (S209: YES), then the processor 10 outputs a control signal based on the specified output information concerning control to the object to be controlled (step S211), and ends the control processing performed in one control period. If determining that an output of a control signal is not necessary at step S209 (S209:NO), then the processor 10 ends the processing without outputting a control signal based on the specified output information concerning control to the object to be controlled. The reference processing at step S207 and the determination processing at step S209 are not necessarily made. In this case, the processor 10 can specify the result of a discrimination between a gear stage and a gear ratio for the transmission E as output information at step S205, and can output to the object to be controlled a control signal based on the specified output information concerning control without referring to the state of the object to be controlled based on the specified output information (S211).

The control part of the processor 10 refers to, for example, a gear stage or a gear ratio for the transmission E at step S207. In this case, the processor 10 compares the gear stage or the gear ratio specified at step S205 and the gear stage or gear ratio referred to at S207 and determines whether or not a difference is present at step S209. If determining that a difference is present, the processor 10 determines that an output of a control signal is necessary at step S209.

The learning mode in the first embodiment can be executed from time when the controller 100 is placed in an initial state in the human-powered vehicle A to when the error between the output information output from the learning model 1M and the control data concerning control based on the actual operation tapers to a predetermined error or smaller. After tapering, the processor 10 of the controller 100 can be operated in the automatic control mode. The learning mode can also be executed until the error similarly tapers after any reset operation is performed.

Second Embodiment

Figure 6:
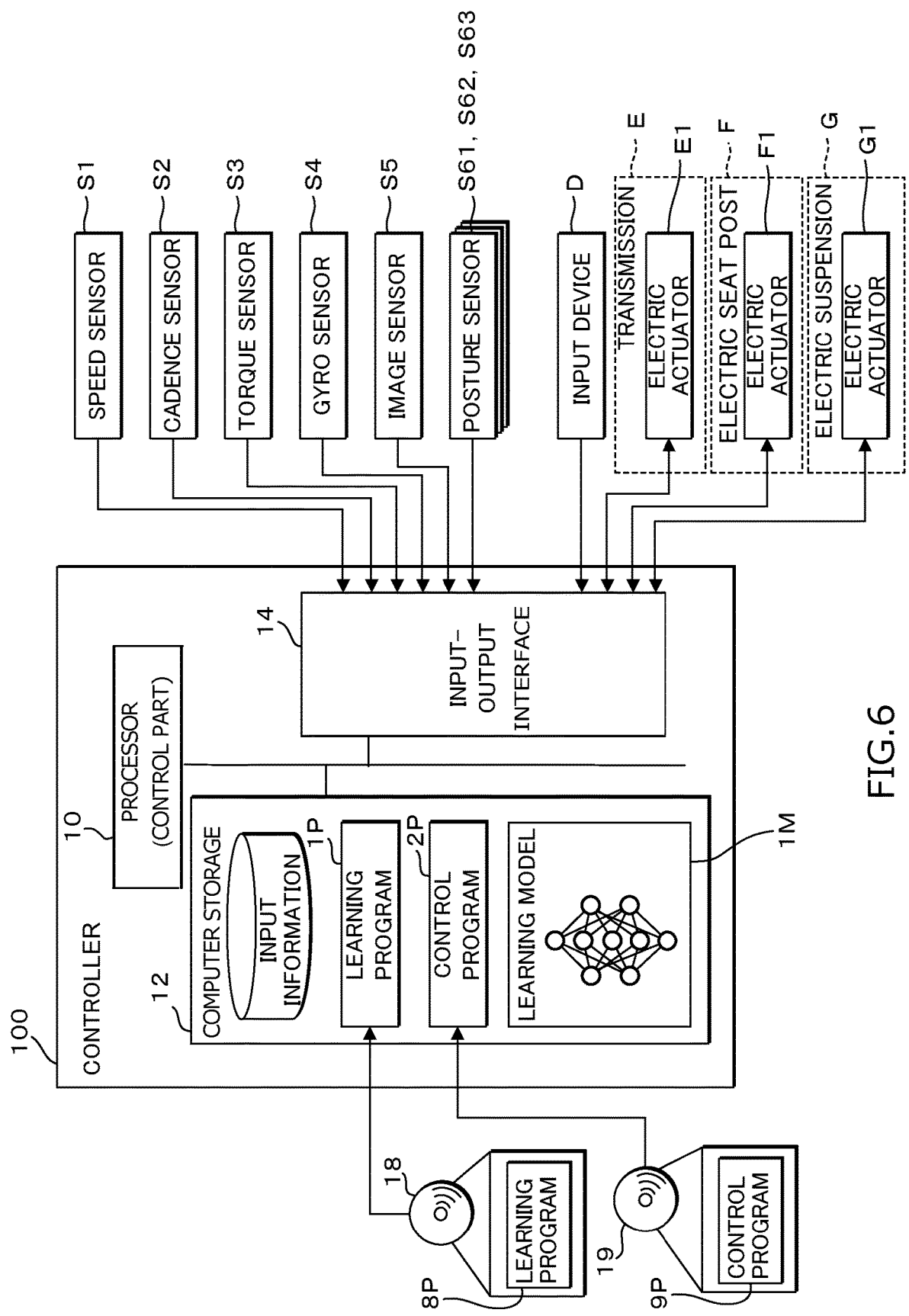
FIG. 6 is a block diagram illustrating a bicycle component control system and schematically illustrating an internal configuration of a controller in conjunction with a plurality of sensors, a user operable input device and a plurality of bicycle components according to a second embodiment.

FIG. 6 is a block diagram illustrating the internal configuration of the controller 100 according to a second embodiment. The human-powered vehicle A and the controller 100 in the second embodiment are similar in configuration to those in the first embodiment except for a storage and the details of processing that are to be described later, and the common components will be denoted by the same reference codes and detailed description thereof will not be repeated. In the second embodiment, the storage 12 of the controller 100 stores input information input through the input-output interface 14 from the sensor groups S1-S5 and S61-S63 mounted on the human-powered vehicle A together with time information by multiple sampling periods. The storage 12 cyclically stores the input information utilizing storage areas of the multiple sampling periods so that the old input information is automatically overwritten.

Figure 7:
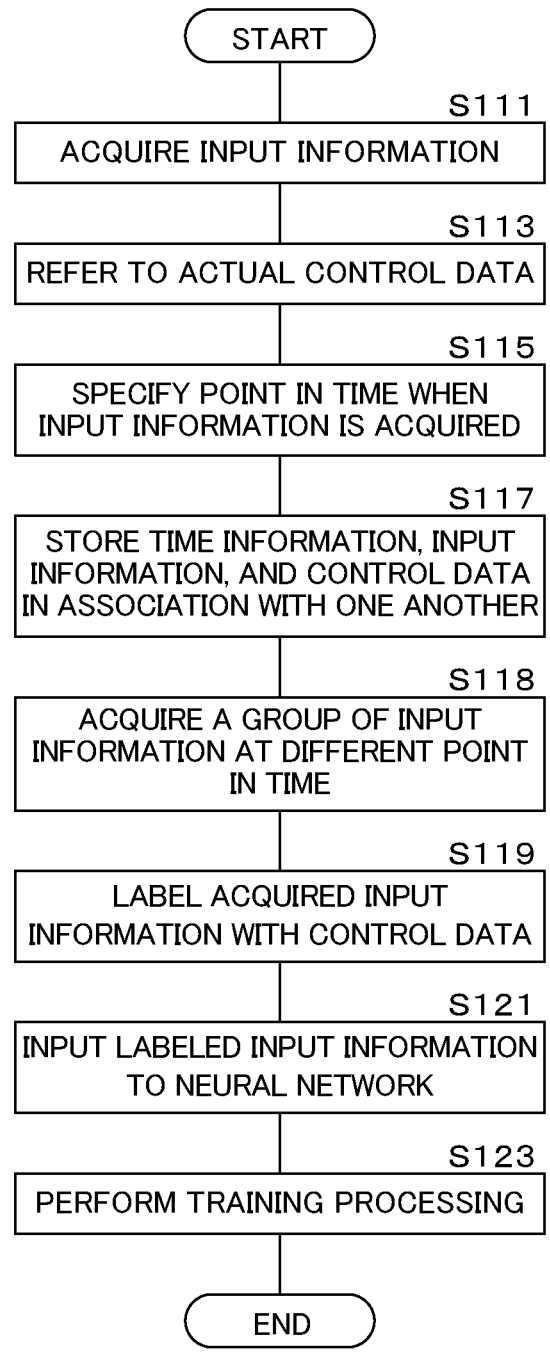
FIG. 7 is a flowchart depicting one example of a processing procedure according to the second embodiment in the learning mode performed by a processor of the controller.

FIG. 7 is a flowchart depicting one example of a processing procedure in the learning mode performed by a processor 10 according to the second embodiment. The processor 10 repeatedly executes the processing procedure illustrated in FIG. 7 every predetermined sampling period (30 milliseconds, for example) during the learning mode for each component to be controlled.

The processor 10 acquires input information concerning traveling of the human-powered vehicle A through the input-output interface 14 (step S111) and refers to actual control data of an object to be controlled at substantially the same timing (step S113). At step S113, the control part of the processor 10 refers to, for example, a gear stage or a gear ratio of the transmission E. The processor 10 specifies the point in time when the input information is acquired at step S111 (step S115). The processor 10 can employ timing information acquired from the internal timer as an acquisition point in time or can employ timing information by converting it into time information.

The processor 10 stores in the storage 12 the time information indicative of the acquisition point in time specified at step S115, the input information acquired at step S111 and the actual control data referred to at step S113 in association with one another (step S117).

The processor 10 acquires a group of input information at different points in time stored in the storage 12 (step S118). The processor 10 labels the acquired group of multiple pieces of input information with the control data referred to at step S113 to thereby create training data (step S119) and inputs the labeled group of input information to an NN 13

(step S121). The processor 10 performs training processing for training with the parameters in the intermediate layer of the NN 13 (step S123) and ends the training processing at one sampling timing.

FIG. 8 illustrates one example of the contents of input information stored in the storage 12 and the outline of training. As illustrated in FIG. 8 in the second embodiment, training processing is executed using multiple pieces of input information acquired at different points in time stored in the storage 12 and the control data being results of the changes of the input information as training data. The actual component control is performed based on the change of state of the traveling human-powered vehicle A depending on its context, not performed independently for every sampling period. It is assumed that a learning model 1M outputting output information concerning control based on the multiple piece of input information at multiple points in time is created and used for reproducing control of the components in practice.

In the second embodiment, the processor 10 applies the multiple pieces of input information to the learning model 1M and controls the component based on the output information concerning control output from the learning model 1M in the automatic control mode as well.

Figure 9:
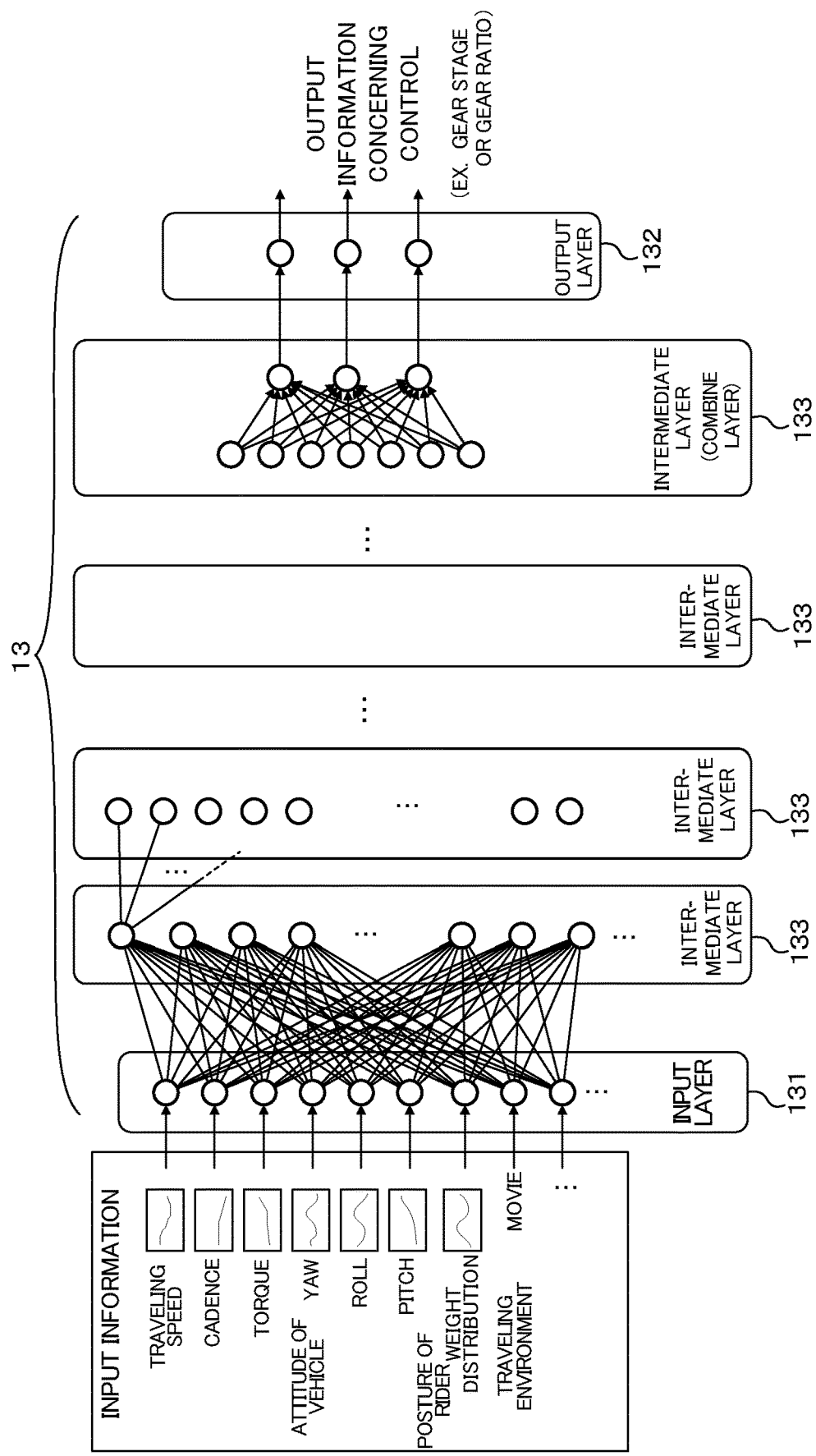
FIG. 9 is one example of a learning model to be created by the processor of the controller using a learning algorithm according to the second embodiment.

In the second embodiment, in place of an input of the multiple pieces of input information at step S121, variations of the multiple pieces of input information can be input to the NN 13. The processor 10 can calculate a variation before and after every sampling period to thereby provide a variation value to the NN 13 or provide a trend of the variation (increase, decrease, maintenance) to the NN 13, or can calculate a waveform corresponding to a time series distribution as a variation and provide it to the NN 13. The variation value can include one or multiple times of time differential values. FIG. 9 is one example of the learning model 1M to be created in the second embodiment. As compared with the example in FIG. 4 illustrated in the first embodiment, FIG. 9 is different in that the input information is a waveform representing its variation.

Third Embodiment

Figure 10:
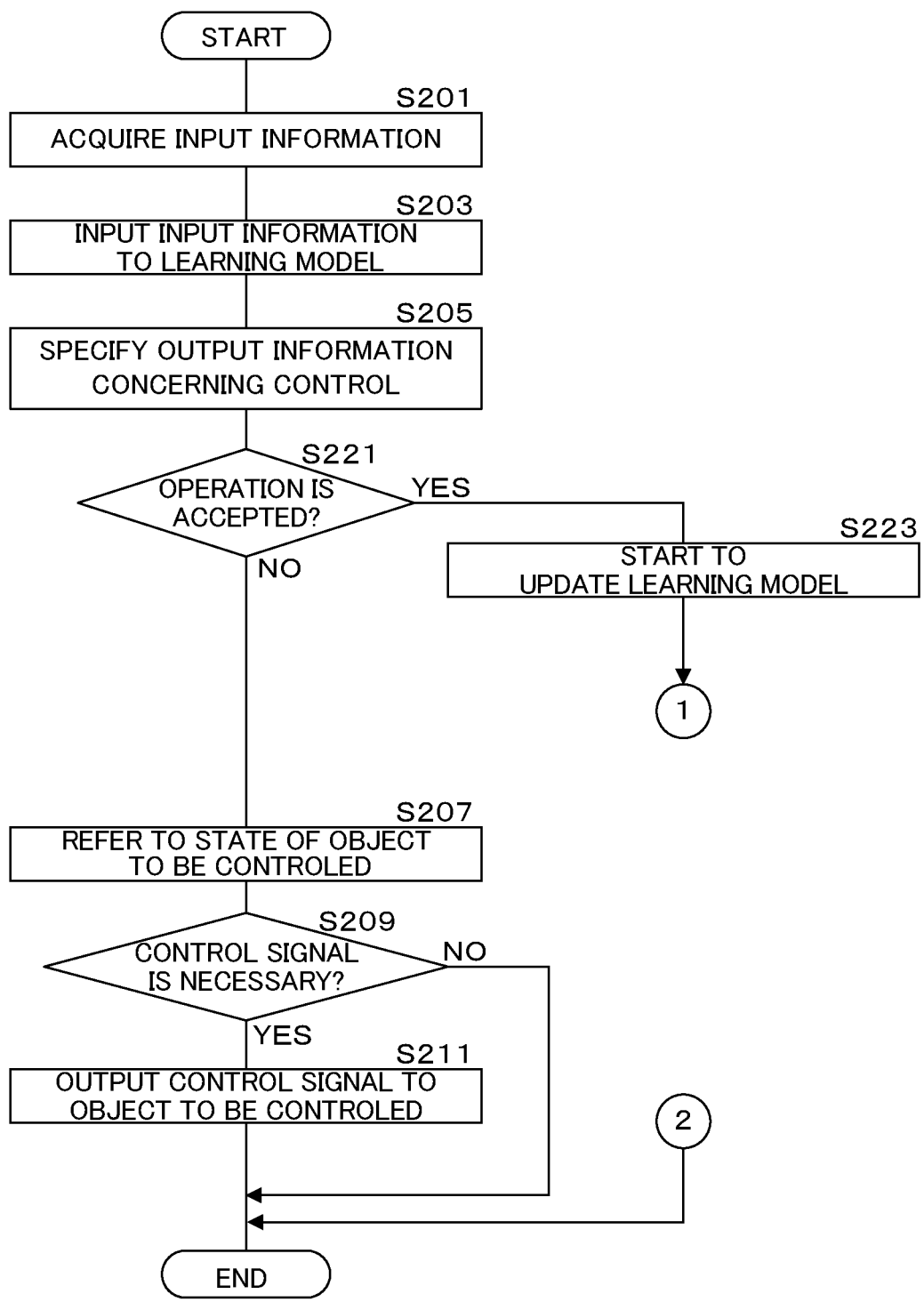
FIG. 10 is a flowchart depicting one example of a processing procedure performed by a processor according to a third embodiment.
Figure 11:
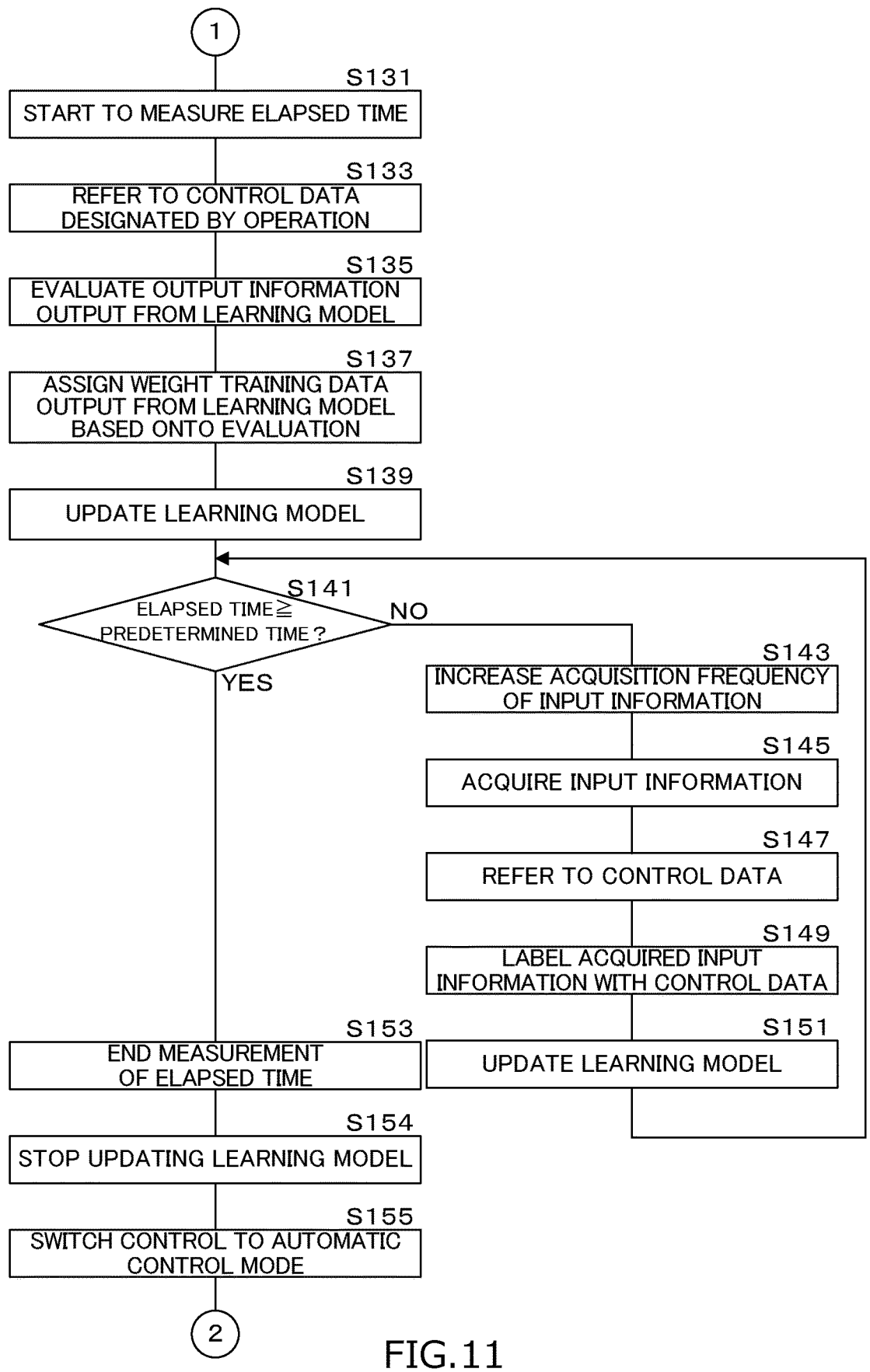
FIG. 11 is a flowchart depicting one example of a processing procedure performed by the processor according to the third embodiment.

In a third embodiment, the controller 100 switches between the learning mode and the automatic control mode based on operation performed on the user operated part D1 of the user operable input device D. The processor 10 updates a learning model 1M based on the operation performed on the user operated part D1 in the learning mode. FIG. 10 and FIG. 11 each are a flowchart depicting one example of a processing procedure performed by the processor 10 in the third embodiment. The processor 10 repeatedly executes the following processing procedure operated in the automatic control mode. Some of the processing procedure shown in the flowcharts illustrated in FIG. 10 and FIG. 11 common to those shown in the flowchart illustrated in FIG. 5 of the first embodiment will be denoted by the same step numbers, and detailed description thereof will not be repeated.

The processor 10 acquires input information (S201), inputs it to the learning model 1M (S203), specifies output information concerning control output from the learning model 1M (S205) and then determines whether or not operation is accepted by the user operated part D1 (step S221). In the third embodiment, the processor 10 determines whether or not shifting operation of a gear stage or a gear ratio is performed by the user operated part D1. In the case of control of the components other than the transmission E, an operation concerning control of each of the components can be accepted by the user operated part D1. If determining that no operation is accepted at step S221 (S221: NO), then the processor 10 continues the operation under the automatic control mode (S207-S211).

The processor 10 can be set so as to determine that operation is performed since the need for training arises if shifting operation of the gear stage is made in the direction opposite to the output information output at step S205 and set so as not to determine that operation is performed if they are made in the same direction.

If it is determined that operation is accepted by the user operated part D1 at step S221 (S221: YES), then the processor 10 starts to update the learning model 1M in the learning mode (step S223) and starts to measure the elapsed time from the start of the learning mode (step S131).

The control part of the processor 10 refers to the control data designated by the operation performed on the user operable input device D, that is, a gear stage or a gear ratio in the learning mode in the third embodiment (step S133). The processor 10 evaluates the output information output from the learning model 1M specified at step S205 based on the control data referred to at step S133 (step S135).

At step S135, the processor 10 makes an evaluation by checking the output information concerning control specified at step S205 against the control data based on the designation operation referred to at step S133. For example, the processor 10 determines whether or not the output information and the control data match within a predetermined error range. If determining that a match occurs, then the processor 10 provides a high evaluation. If determining that a match does not occur, then the processor 10 provides a low evaluation. If determining that a match does not occur, then the processor 10 provides a different evaluation in correspondence with the degree of match between the output information specified at step S205 and the control data referred to at step S133. As the difference between the output information specified at step S205 and the control data referred to at step S133 is larger, the processor 10 provides a lower evaluation. If shifting operation of a gear stage by the user operated part D1 is made in the direction opposite to the control data output at step S205, then the processor 10 provides a much lower evaluation. For example, the evaluation can be represented by a numerical value, and positive values are assumed for the high evaluation while negative values are assumed for the low evaluation. The degree of evaluation is assumed to be larger as the absolute value is larger.

The processor 10 assigns a weight based on the evaluation at step S135 to the training data created by labeling the input information acquired at step S201 with the output information concerning control output from the learning model 1M (step S137). The processor 10 updates the learning model 1M based on the weighted training data (step S139). At step S137, the processor 10 assigns a weight indicating a higher degree of importance to the training data as the evaluation is lower. The processing at steps S137 and S139 can be executed in the case where the output information and the control data do not match with each other when evaluation is made at step S135.

The processor 10 determines whether or not the elapsed time started to be measured at step S131 is equal to or more than a predetermined time (step S141).

If determining that the elapsed time is less than the predetermined time (S141: NO), the processor 10 makes the sampling period shorter, that is, increases the acquisition frequency of input information (step S143). The processor 10 acquires input information at the changed sampling period (step S145) and refers to actual control data (step S147). The processor 10 labels the input information acquired at step S145 with the referred-to control data to thereby create training data (step S149), updates the learning model 1M based on the training data of the labeled input information (step S151) and returns the processing to step S141. At step S149, the processor 10 can assign a weight indicating the degree of importance of the labeled input information to be input depending on the degree of evaluation at step S135 to the training data and provide it to the learning model 1M.

If determining that the elapsed time is equal to or more than the predetermined time at step S141 (S141: YES), then the processor 10 ends the measurement of the elapsed time (step S153) and stops the update of the learning model 1M (step S154). The processor 10 ends the operation in the learning mode, switches it to the automatic control mode (step S155) and ends the processing.

In the third embodiment, the controller 100 can temporarily store in time series input information one by one in the storage 12 in association with actual control data similarly to the second embodiment. In this case, the processor 10 can perform the following processing instead of updating the output information concerning control to which a low evaluation is provided at step S137. If accepting designation operation performed on the user operated part D1, the processor 10 sets the input information acquired before and after the timing when the designation operation is performed as an input and updates the learning model 1M by the input and the details of the operation by the user operated part D1. In the first example, the designated detail by the user operated part D1 is at least one of a gear stage and a gear ratio for the transmission E. In the second example, the designated detail is a supported position for the electric seat post F. In the third example, the designated detail is setting information such as a damping factor, a stroke amount and a locked out state of the electric suspension G. The following description is made with reference to FIG. 8 in the second embodiment. The actual control data is changed from "2" to "3" at the timing when the processor 10 acquires input information associated with the time information "1645." Hence, it is determined that designation operation is accepted here by the user operated part D1. The processor 10 updates the learning model 1M based on the training data labeled with the control data "3" of the details of the operation without assigning the weight of a low evaluation to the training data obtained by labeling the input information acquired at the time information "1334" before the time information "1645" with the output information "2." The processor 10 can similarly perform an update by labeling the input information acquired at the time information "1028" with the control data rewritten from "2" to "3" and inputting the labeled input information to the learning model 1M.

At step S143, the processor 10 can update the learning model 1M by increasing the number of acquisition instead of or in addition to increasing the acquisition frequency.

In the third embodiment, the processor 10 ends the operation in the learning mode, which is started regarding the operation by the user operated part D1 as a trigger, depending on whether the elapsed time is equal to or more than the predetermined time at step S141 and switches it to the automatic control mode. In place of step S141, the processor 10 can cause the learning model 1M updated at step 151 to output information concerning control, check the output information concerning control against the control data if designation operation is accepted by the user operated part D1 to thereby reevaluate the output information from the learning model 1M based on the result of checking, and end the operation in the learning mode if a high evaluation occurs. The processor 10 provides a high evaluation if the output information output from the learning model 1M matches the control data designated by the operation within the predetermined error range.

Fourth Embodiment

Figure 12:
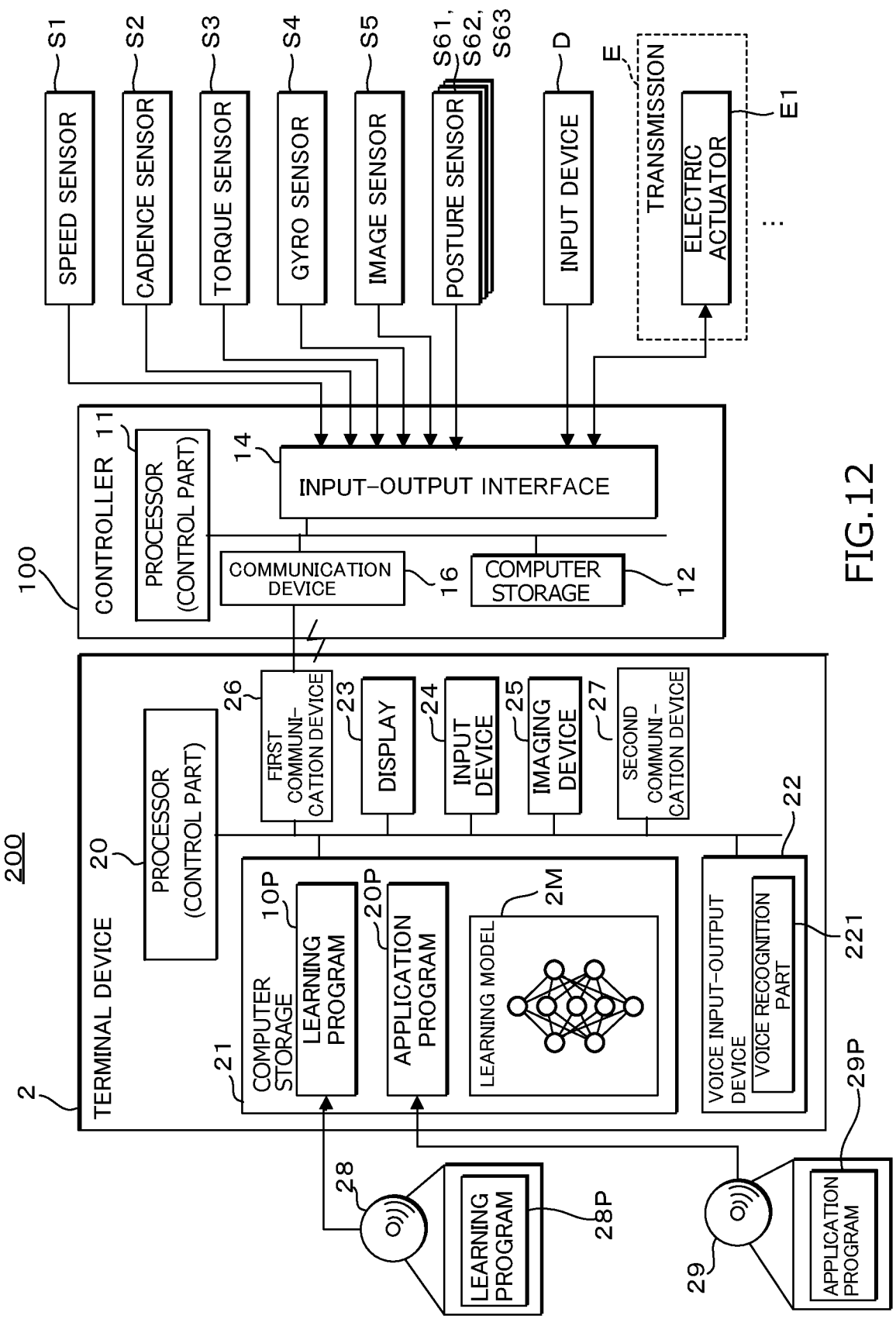
FIG. 12 is a block diagram schematically illustrating the configuration of a bicycle component control system including a terminal device, the controller, a plurality of sensors, a user operable input device and a plurality of bicycle components.

In a fourth embodiment, the learning model creation processing and the component control processing are executed by a terminal device of the user in place of the controller 100. FIG. 12 is a block diagram illustrating the configuration of a control system 200. The control system 200 includes a terminal device 2 and the controller 100. The controller 100 in the fourth embodiment includes a processor 11, a storage 12, an input-output interface 14 and a communication device 16. Some of the components of the controller 100 in the fourth embodiment common to those of the controller 100 in the first and second embodiments will be denoted by the same reference codes, and detailed description thereof will not be repeated.

The processor 11 of the controller 100 in the fourth embodiment, which is a computer processor utilizing a CPU, executes processing by controlling each of the components with the use of a memory such as a built-in ROM, RAM and so on. The processor 11 does not execute the training processing performed by the processor 10 of the controller 100 in the first embodiment. The processor 11 receives an input from the sensor groups S1-S5 and S61-S63 mounted on the human-powered vehicle A through the input-output interface 14, and transmits the input to the terminal device 2 via the communication device 16. The control part of the processor 11 refers to a control state of the user operable input device D and an operation signal output from the user operable input device D, and transmits them to the terminal device 2 via the communication device 16. The processor 11 applies a control signal to the electric actuator E1 to be controlled based on the operation signal output from the user operable input device D or an instruction output from the terminal device 2.

A communication device is a hardware device capable of transmitting an analog or digital signal over a communication wire, or a wireless signal. One example of communication devices includes a powerline communication module, a USB communications interface, a NIC (network interface card), Wi-Fi devices, and access points. The communication device 16 includes a communication port, and the processor 11 transmits and receives information to and from the terminal device 2 via the communication device 16. The communication device 16 includes a universal serial bus (USB) port in the first example. The communication device 16 includes a short range wireless communication module such as Bluetooth® in the second example. The term "wireless communication device" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth® communications or any other type of signal suitable for short range wireless communications as understood in the bicycle field.

The terminal device 2 is a portable compact communication terminal device to be used by the user. The terminal device 2 is a smartphone in the first example. The terminal device 2 is a wearable device such as a so-called smartwatch or the like in the second example. For the smartphone, a smartphone holding member can be attached to the handlebar A2 of the human-powered vehicle A, and the smartphone can be used while being put on the holding member (see FIG. 13).

The terminal device 2 includes a processor 20, a storage 21, a display 23, a user operable input device 24, an imaging device 25, a first communication device 26 and a second communication device 27.

The processor 20 includes a computer processor such as a CPU, a GPU, and a memory and so on. The processor 20 can be constituted as a single hardware (SoC: System On a Chip) integrated with the memory, the storage 21, the first communication device 26 and the second communication device 27. The processor 20 executes training of the output information concerning control of the human-powered vehicle A and component control based on the training according to an application program 20P stored in the storage 21.

The storage 21 includes a non-volatile memory such as a flash memory, for example. The storage 21 stores a learning program 10P and the application program 20P. The learning program 10P can be included in the application program 20P. The storage 21 stores a learning model 2M created by the processing performed by the processor 20. The storage 21 stores data to which the processor 20 refers. The learning program 10P can be obtained by reading out a learning program 28P stored in a recording medium 28 and copying it in the storage 21. The application program 20P can be obtained by reading out an application program 29P stored in a storage medium 29 and copying it in the storage 21.

The display 23 includes a display device such as a liquid crystal panel, an organic electroluminescence (EL) display, or the like. The user operable input device 24 is an interface for accepting operation by the user and includes a physical button and a display-integrated touch panel device. The user operable input device 24 can accept operation performed on the screen displayed by the display 23 via the physical button or the touch panel.

The voice input-output device 22 includes a speaker, a microphone and so on. The voice input-output device 22 is provided with a voice recognition part 221 and is able to accept operation by recognizing the details of operation from input voice via the microphone.

The imaging device 25 outputs a video signal obtained by using an image sensor. The processor 20 can obtain an image photographed by an image sensor of the imaging device 25 at any timing.

The first communication device 26 is a communication module that corresponds to the communication device 16 of the controller 100. The first communication device 26 is a USB communication port in the first example. The first communication device 26 is a short range wireless communication module in the second example.

The second communication device 27 is a wireless communication module for achieving transmission and reception of information to and from another communication device (not illustrated) through a public communication network or according to a predetermined mobile communication standard. The second communication device 27 employs a network card, a wireless communication device or a carrier communication module.

In the fourth embodiment, the controller 100 continuously acquires input information obtained from the sensor groups S1-S5 and S61-S63 mounted on the human-powered vehicle A through the input-output interface 14, and transmits the input information to the terminal device 2 via the communication device 16.

The processor 20 of the terminal device 2 operates in the learning mode and the automatic control mode. The processor 20 functions as a creation part that creates a learning model 2M by a learning algorithm of deep learning based on the learning program 10P if operated in the learning mode. In the learning mode, the terminal device 2 corresponds to a "creation device." The processor 20 of the terminal device 2 functions as a control part that automatically controls the components including the transmission E using the learning model 2M based on the application program 20P if operated in the automatic control mode. In the automatic control mode, the terminal device 2 corresponds to a "component control device."

The operation of the terminal device 2 in the learning mode is similar to that of the processor 10 in the controller 100 illustrated in the first embodiment or the second embodiment. The operation of the terminal device 2 in the automatic control mode is also similar to that of the processor 10 in the controller 100 illustrated in the first embodiment or the second embodiment.

In the fourth embodiment, the terminal device 2 corresponding to the "creation device" or the "component control device" accepts an evaluation by the user based on the information obtained by the user operable input device 24 or the imaging device 25 and updates the learning model 2M according to the details of the evaluation.

Figure 13:
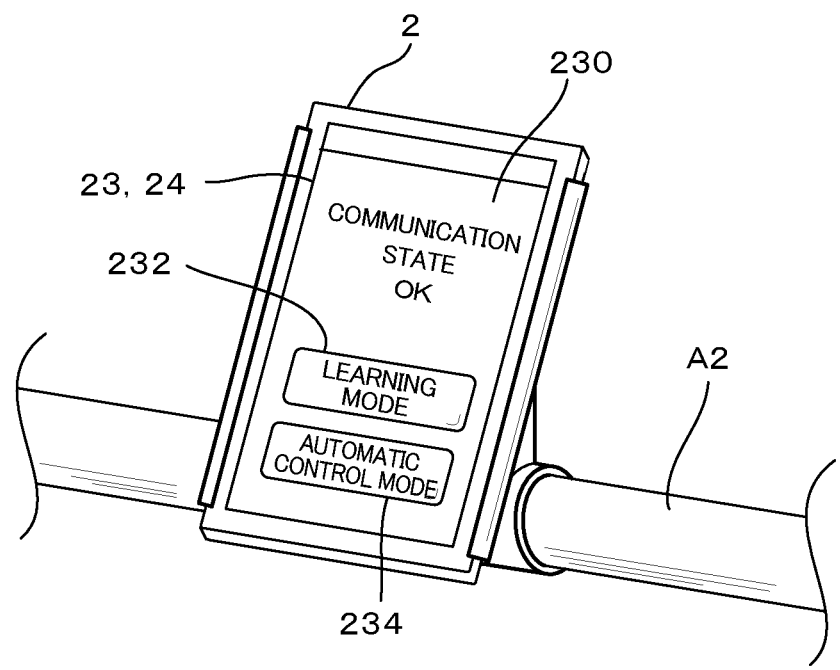
FIG. 13 is a perspective view of a portion of the bicycle having the terminal device displaying an example of a screen that is displayed based on an application program.
Figure 14:
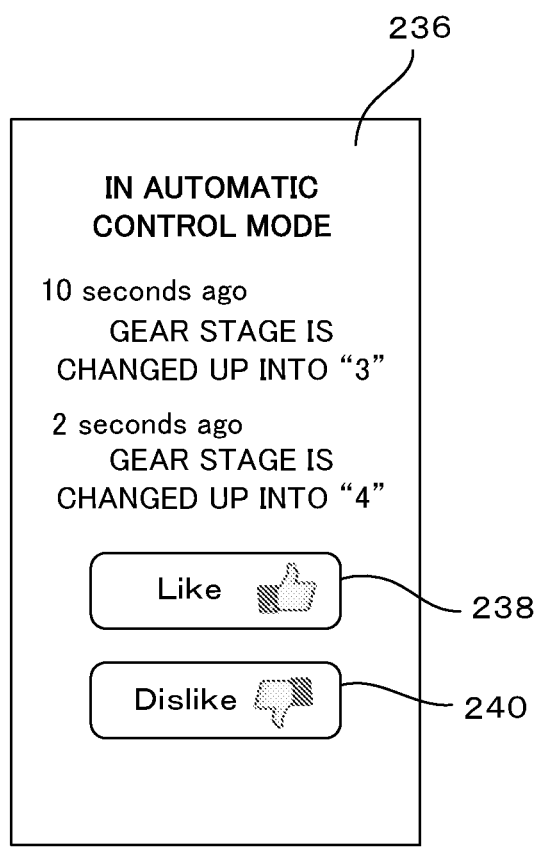
FIG. 14 is an elevational view of the screen of the terminal device showing an example of a screen that is displayed based on the application program.

FIGS. 13 and 14 each illustrate an example of a screen displayed based on the application program 20P. In the example illustrated in FIG. 13, the terminal device 2 is a smartphone and attached to the handlebar A2 so as to allow the user to view the display 23. FIG. 13 illustrates a main screen 230 displayed on the display 23 based on the application program 20P. The processor 20 causes the display 23 to display the main screen 230 if execution of the application program 20P is selected. The processor 20 establishes communication with the controller 100 when execution of the application program 20P is started. The processor 20 can display a message indicating a communication state on the main screen 230 as illustrated in FIG. 13. On the main screen 230, selection buttons 232 and 234 for the learning mode and the automatic control mode are included. The processor 20 starts the operation in the learning mode if the selection button 232 is selected whereas the processor 20 starts the operation in the automatic control mode if the selection button 234 is selected.

FIG. 14 is an example of the content of an automatic control mode screen 236 to be displayed if the selection button 234 for the automatic control mode is selected. For the automatic control mode screen 236, if determining that an output of a control signal to the transmission E is necessary and outputting a control signal, the processor 20 displays a message indicating that a gear stage or a gear ratio is changed, or outputs the message by voice from the voice input-output device 22. The processor 20 accepts an evaluation of this message. The processor 20 accepts the evaluation by the user for the action of the component based on the output information output from the learning model 2M by any example described below.

The first example of the "evaluation acceptance part" includes a high evaluation button 238 and a low evaluation button 240 for accepting an evaluation that are included in the automatic control mode screen 236 illustrated in FIG. 14. The processor 20 recognizes selection operation performed on the evaluation button 238 or 240 via the touch panel of the operation input part 24 and accepts the evaluation. The high evaluation button 238 in the example illustrated in FIG. 14 is selected if automatic control of the gear stage or the gear ratio is comfortable. The low evaluation button 240 is selected if the automatic control is not comfortable. The processor 20 becomes aware of which one of the buttons 238 and 240 is selected and recognizes the accepted details of evaluation. As a modification of the first example of the "evaluation acceptance part," only the low evaluation button 240 can be displayed. As a modification of the first example of the "evaluation acceptance part," a button for making such an evaluation that the shifted gear stage or gear ratio is too heavy (too OUTWARD) and a button for making such an evaluation that it is too light (too INWARD) can be included.

The second example of the "evaluation acceptance part" can be a physical button provided on the user operated part D1. A specific evaluation acceptance button can be provided on the user operated part D1. An evaluation acceptance button can separately be provided close to the user operable input device D. The processor 20 can recognize the details of the evaluation based on whether or not the specific evaluation acceptance button is pressed as well as the way of pressing a general-purpose button and a combination with a lever operation. The third example of the "evaluation acceptance part" is a voice recognition part 221 of the voice input-output device 22. The processor 20 accepts an evaluation by recognizing voice of the user by the voice recognition part 221. The processor 20 determines whether or not automatic control is comfortable based on the recognized voice. The fourth example of the "evaluation acceptance part" is the imaging device 25. The processor 20 is a specification part for specifying facial expressions from an image obtained by photographing the face of the user riding the human-powered vehicle A and accepts the evaluation based on the specified facial expressions. The evaluation is obtained by determining whether or not automatic control is comfortable, and a high evaluation is assumed if comfortable.

Figure 15:
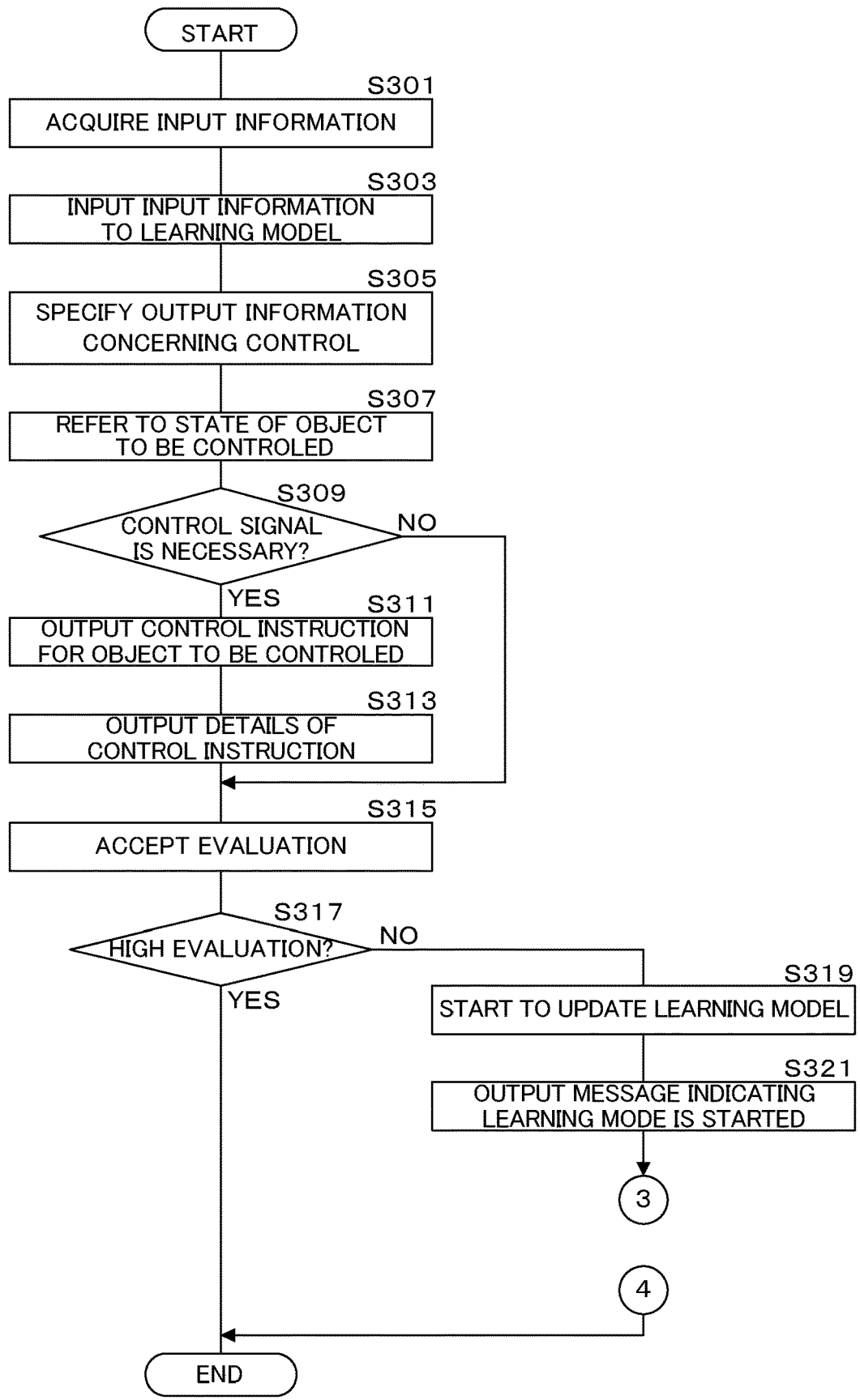
FIG. 15 is a first flowchart part depicting one example of a processing procedure performed by a processor according to a fourth embodiment.
Figure 16:
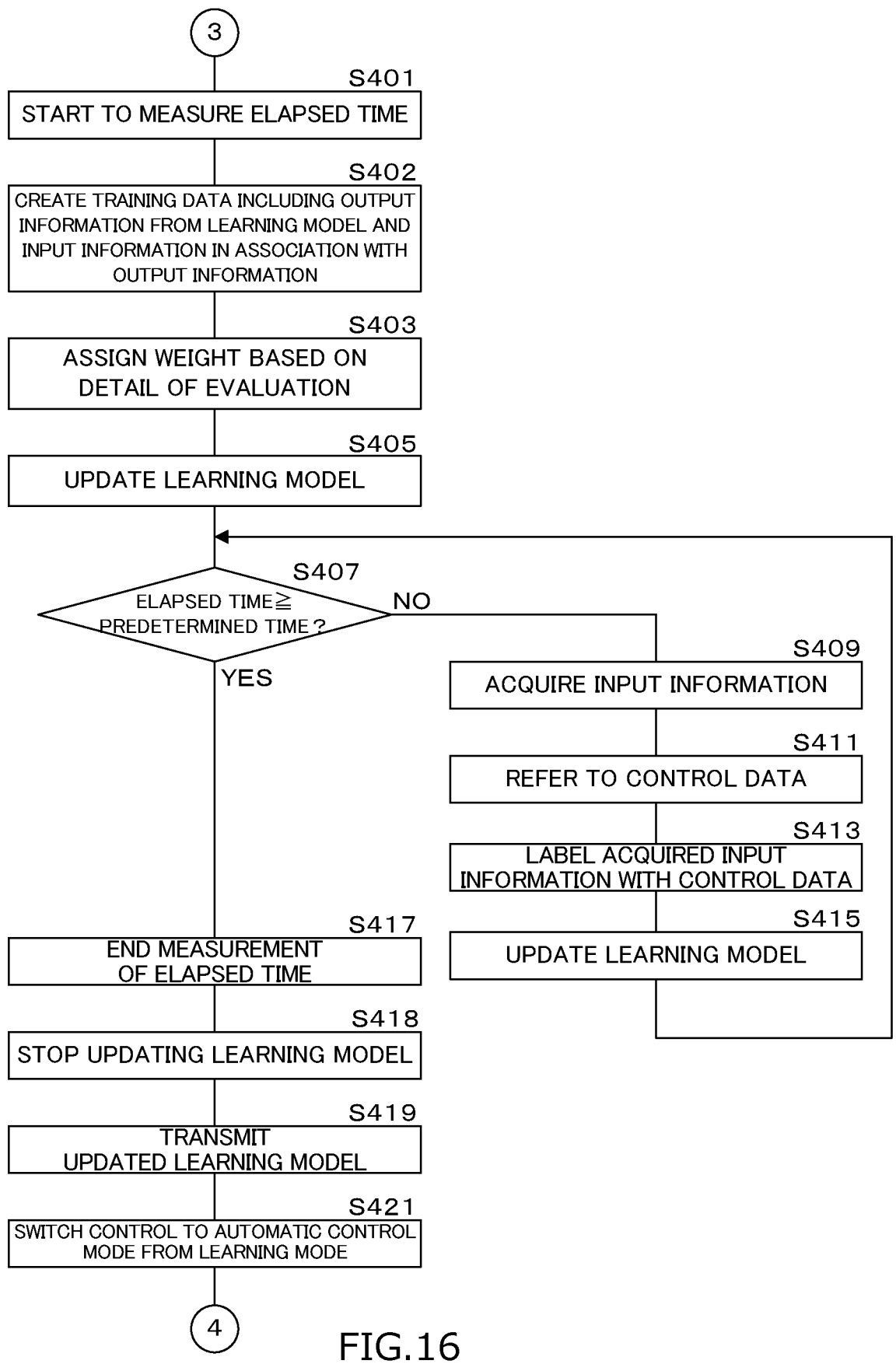
FIG. 16 is a second flowchart part depicting the example of the processing procedure performed by the processor according to the fourth embodiment.

FIG. 15 and FIG. 16 each are a flowchart depicting one example of the processing procedure performed by the processor 20 in the fourth embodiment. The processor 20 repeatedly executes the following processing procedure operated in the automatic control mode. It can be executed at a predetermined control period (30 milliseconds, for example).

The processor 20 acquires input information concerning running of the human-powered vehicle A obtained from the controller 100 via the first communication device 26 (step S301). At step S301, the processor 20 acquires signal levels obtained by the processor 10 of the controller 100 referring to the signal levels from the sensor groups S1-S5 and S61-S63 for every control period, and temporarily storing them in the internal memory of the processor 10 or the memory integrated in the input-output interface 14.

The processor 20 inputs the input information acquired at step S301 to the learning model 2M created in the storage 21 (step S303).

The processor 20 specifies output information concerning control of the component to be controlled that is to be output from the learning model 2M (step S305). The processor 20 specifies a result of discrimination between a gear stage and a gear ratio for the transmission E, for example, at step S305.

The control part of the processor 20 refers to the state of the object to be controlled (step S307). The processor 20 can refer to the feedback of a gear stage or a gear ratio for the transmission E, for example, via the controller 100 at step S307. The processor 20 determines whether or not an output of a control signal is necessary based on the relation between the details of the control indicated by the output information specified at step S305 and the state referred to at step S307 (step S309). If determining that an output of a control signal is necessary at step S309 (S309: YES), the processor 20 outputs a control instruction to the controller 100 (step S311). The processor 20 outputs the details of the control instruction to the display 23 (step S313). If determining that an output of a control signal is not necessary at step S309 (S309: NO), the processor 20 advances the processing to step S315.

The processor 20 accepts an evaluation within a predetermined time period after the processing at steps S311 and S313 (step S315).

The processor 20 determines whether or not the accepted evaluation is a high evaluation (step S317). If determining that it is a high evaluation (S317: YES), the processor ends the control processing.

If determining that it is not a high evaluation at step S317 (S317: NO), the processor 20 starts to operate under the learning mode, that is, to update the learning model 2M (step S319) and outputs a message indicating that the learning mode is started to the display 23 (step S321). At step S317, the processor 20 can start to update the learning model 2M irrespective of whether an accepted evaluation is a high evaluation or not if the evaluation is accepted.

The processor 20 starts to measure the elapsed time from the start of the learning mode (step S401). The processor 20 creates training data including the output information output from the learning model 2M at step S305 corresponding to the timing when the evaluation from the user is accepted, the input information in association with the output information acquired at step S301 and the details of evaluation accepted at step S315 (step S402). The processor 20 assigns a weight based on the details of the evaluation to the training data (step S403). The processor 20 updates the learning model 2M based on the weighted training data (step S405). At step S405, the processor 20 assigns a weight indicating a higher degree of importance to the training data as the evaluation is lower.

The processor 20 determines whether or not the elapsed time from when measurement started at step S401 is equal to or more than a predetermined time or more (step S407).

If determining that the elapsed time is less than the predetermined time (S407: NO), the processor 20 acquires input information under the learning mode (step S409) and refers to actual control data based on the user operated part D1 (step S411). The processor 20 labels the input information acquired at step S409 with the referred-to control data to thereby create training data (step S413), then updates the learning model 2M based on the training data of the labeled input information (step S415) and returns the processing to step S407.

If determining that the elapsed time is equal to or more than the predetermined time at step S407 (S407: YES), the processor 20 ends the measurement of the elapsed time (step S417) and stops the update of the learning model 2M (step S418). Then, the processor 20 transmits the learning model 2M created by the update to another server device via the second communication device 27 (step S419). The processor 20 switches the operation to the automatic control mode (step S421) and ends the processing.

The processor 20 can transmit the learning model 2M from the second communication device 27 to another server while the terminal device is detached from the human-powered vehicle A at a predetermined frequency, such as once a day or once a week, not at the end of the learning mode.

The processor 20 can determine whether the evaluation accepted by the evaluation acceptance part about the details of the control based on the output information output from the learning model 2M is a high evaluation or is higher than a predetermined value, in place of step S407. In this case, if determining that the evaluation is higher than the predetermined value, the processor 20 stops the update of the learning model 2M (S418).

In the fourth embodiment, the terminal device 2 can temporarily store input information in the storage 21 in time series one by one in association with actual control data similarly to the second embodiment. In this case, the processor 20 can perform the following processing instead of update using the training data to which a weight based on the details of the evaluation is assigned at step S405. The processor 20 sets multiple pieces of input information acquired before and after the timing when the evaluation is accepted by the evaluation acceptance part as an input and updates the learning model 2M using the training data including the output information output from the learning model 2M and the evaluation accepted by the evaluation acceptance part.

In the fourth embodiment, the terminal device 2 transmits the created learning model 2M addressed to another server via the second communication device 27. The controller 100 in the first embodiment can be provided with a communication device like the second communication device 27 and can transmit the created learning model 1M addressed to another server via the communication device.

In the first to fourth embodiments, as output information output from the learning model 1M or the learning model 2M, control data concerning control of the transmission E is mainly described. The component to be controlled of the human-powered vehicle A can be the electric seat post F or the electric suspension G in place of the transmission E. The components as objects to be controlled of the human-powered vehicle A can be the transmission E, the electric seat post F and the electric suspension G or can be the electric seat post F and the electric suspension G.

What is claimed is:

1. A controller formed of hardware that executes a software program, the controller comprising:
    a non-transitory computer readable storage having a learning algorithm stored in the non-transitory computer readable storage; and
    at least one processor operatively coupled to the non-transitory computer readable storage to execute operations including:
    an acquisition part configured to acquire input information concerning traveling of a human-powered vehicle; and
    a creation part configured to use the learning algorithm to create a learning model that outputs output information concerning control of a component of the human-powered vehicle based on the input information,
    the controller being configured to operate in a learning mode and in an automatic control mode,
    the controller being an electronic controller or a microcomputer having the non-transitory computer readable storage stored therein, and
    the output information including probabilities respectively corresponding to nodes of at least one of a gear stage and a gear ratio for a transmission.

2. The controller according to claim 1, wherein the input information includes at least one of a traveling speed of the human-powered vehicle and a cadence of a crank of a driving mechanism.

3. The controller according to claim 1, wherein the input information includes detection data of an attitude of the human-powered vehicle.

4. The controller according to claim 1, wherein the input information includes detection data of a posture of a user riding on the human-powered vehicle.

5. The controller according to claim 1, wherein the input information includes detection data of a traveling environment of the human-powered vehicle.

6. A controller formed of hardware that executes a software program, the controller comprising:
    a non-transitory computer readable storage having a learning algorithm stored in the non-transitory computer readable storage; and
    at least one processor operatively coupled to the non-transitory computer readable storage to execute operations including:
    an acquisition part configured to acquire input information concerning traveling of a human-powered vehicle; and
    a creation part configured to use the learning algorithm to create a learning model that outputs output information concerning control of a component of the human-powered vehicle based on the input information,
    the controller being configured to operate in a learning mode and in an automatic control mode,
    the controller being an electronic controller or a microcomputer having the non-transitory computer readable storage stored therein,
    the acquisition part is being configured to acquire the input information obtained at different points in time, and
    the creation part is being configured to input the input information at the different points in time to the learning model.

7. The controller according to claim 1, wherein the acquisition part is configured to acquire the input information obtained at different points in time, and the creation part is configured to input a variation of the input information to the learning model.

8. The controller according to claim 1, wherein the processor further executes an operation that includes an evaluation part that evaluates the output information output from the learning model,
    the creation part being configured to update the learning model based on an evaluation by the evaluation part.

9. A controller formed of hardware that executes a software program, the controller comprising:
    a non-transitory computer readable storage having a learning algorithm stored in the non-transitory computer readable storage;
    at least one processor operatively coupled to the non-transitory computer readable storage to execute operations including:
    an acquisition part configured to acquire input information concerning traveling of a human-powered vehicle;
    a creation part configured to use the learning algorithm to create a learning model that outputs output information concerning control of a component of the human-powered vehicle based on the input information; and an evaluation part that evaluates the output information output from the learning model; and a user operable input device configured to accept a designation operation concerning the output information, the controller being configured to operate in a learning mode and in an automatic control mode, the controller being an electronic controller or a microcomputer having the non-transitory computer readable storage stored therein, the creation part being configured to update the learning model based on an evaluation by the evaluation part, and the evaluation part being configured to make the evaluation based on collation between the output information output from the learning model based on the input information acquired by the acquisition part and the designation operation accepted by the user operable input device.

10. The controller according to claim 9, wherein the evaluation part is configured to provide a low evaluation upon determining the output information output from the learning model and a detail of the designation operation do not match with each other.

11. The controller according to claim 9, wherein the creation part is configured to update the learning model by assigning a weight based on training data including a detail of the designation operation upon determining the output information output from the learning model and the detail of the designation operation do not match with each other.

12. The controller according to claim 11, wherein the weight is different depending on a degree of match between the output information output from the learning model and the detail of the designation operation.

13. The controller according to claim 9, wherein the acquisition part is configured to temporarily store a plurality of pieces of the input information in time series one by one in the non-transitory computer readable storage, and the creation part is configured to set, upon determining acceptance of the designation operation by the user operable operation input device, the pieces of the input information acquired before and after a timing when the designation operation is performed as an input and update the learning model using the input and a detail of the operation of the user operable operation input device.

14. The controller according to claim 13, wherein the creation part is configured to update the learning model by increasing a number of acquisitions of the input information upon determining the designation operation is accepted by the user operable operation input device.

15. The controller according to claim 13, wherein the creation part is configured to update the learning model by increasing an acquisition frequency of the input information upon determining the designation operation is accepted by the user operable operation input device.

16. The controller according to claim 8, further comprising an evaluation acceptance part configured to accept an evaluation provided by a user for action of the component based on the output information output from the learning model, and the learning model being updated based on training data including an accepted detail of the evaluation, the output information output from the learning model at a timing when the evaluation is accepted, and the input information in association with the output information.

17. The controller according to claim 16, wherein a user operable input device configured to accept a designation operation concerning the output information, and the evaluation acceptance part being provided at the user operable input device or near the user operable input device so as to accept an evaluation operation by the user.

18. The controller according to claim 16, wherein the evaluation acceptance part includes a specification part that specifies facial expressions from a photographed image obtained by photographing a face of a user who is riding the human-powered vehicle, and that accepts an evaluation made by the user based on the facial expressions specified by the specification part.

19. The controller according to claim 16, wherein the evaluation acceptance part includes a voice recognition part and accepts an evaluation by recognizing a voice of the user.

20. The controller according to claim 1, further comprising a transmission device that transmits a created learning model.

21. A controller formed of hardware that executes a software program, the controller comprising:

a non-transitory computer readable storage having a learning model that outputs output information concerning control of a component of a human-powered vehicle based on input information concerning traveling of the human-powered vehicle; and at least one processor operatively coupled to the non-transitory computer readable storage to execute operations including:

an acquisition part configured to acquire the input information; and a control part configured to control the component based on the output information output from the learning model by inputting the input information acquired by the acquisition part to the learning model, the controller being configured to operate in a learning mode and in an automatic control mode, the controller being an electronic controller or a microcomputer having the non-transitory computer readable storage stored therein, and the output information including probabilities respectively corresponding to nodes of at least one of a gear stage and a gear ratio for a transmission.

22. The controller according to claim 21, further comprising a user operable input device configured to accept a designation operation of at least one of a gear stage and a gear ratio for the transmission, the acquisition part being configured to temporarily store a plurality of pieces of the input information in time series one by one in the non-transitory computer readable storage, and upon determining acceptance of the designation operation by the user operable input device, the pieces of the input information acquired before and after a timing when the designation operation is performed is read out from the non-transitory computer readable storage so as to be set as input data, and the learning model is updated based on training data including the input data and at least one of the gear stage and the gear ratio designated by the operation of the user operable input device.

23. The controller according to claim 21, further comprising
a user operable input device configured to accept a designation operation concerning the output information,
the acquisition part being configured to temporarily store a plurality of pieces of the input information in time series one by one in the non-transitory computer readable storage, and
upon determining acceptance of the designation operation by the user operable input device, the pieces of the input information acquired before and after a timing when the designation operation is performed is read out from the non-transitory computer readable storage so as to be set as input data, and the learning model is updated based on training data including the input data and the output information designated by the operation of the user operable input device.

24. The controller according to claim 21, further comprising
a user operable input device configured to accept a designation operation concerning the output information,
the learning model being started to be updated upon determining the designation operation is accepted by the user operable input device.

25. The controller according to claim 24, wherein
the learning model is stopped being updated after a predetermined time has elapsed.

26. The controller according to claim 21, further comprising
an evaluation acceptance part configured to accept an evaluation of a detail of control performed by the control part,
the acquisition part being configured to temporarily store a plurality of pieces of the input information in time series one by one in the non-transitory computer readable storage, and
upon determining acceptance of the evaluation by the evaluation acceptance part, the pieces of the input information acquired before and after a timing when the evaluation is accepted by the evaluation acceptance part is read out from the non-transitory computer readable storage so as to be set as input data, and the learning model is updated based on training data including the input data and the evaluation accepted by the evaluation acceptance part.

27. The controller according to claim 26, wherein
the learning model is started to be updated upon determining the evaluation is accepted by the evaluation acceptance part.

28. The controller according to claim 27, wherein
the learning model is stopped being updated after a predetermined time has elapsed.

29. The controller according to claim 27, wherein
the learning model is stopped being updated upon determining the evaluation accepted by the evaluation acceptance part is higher than a predetermined value.

30. A non-transitory computer learning model disposed upon a non-transitory computer readable storage medium and executable by a processor, the non-transitory computer learning model comprising:
an input layer to which input information concerning traveling of a human-powered vehicle is input;
an output layer from which output information concerning control of a component of the human-powered vehicle is output; and
an intermediate layer that is trained based on training data including a detail of operation accepted by a user operable input device that accepts a designation operation concerning the output information,
the learning model being used for processing of acquiring input information and applying the input information to the input layer, performing a computation based on the intermediate layer, and outputting the output information corresponding to the input information from the output layer.

31. The non-transitory computer learning model according to claim 30, wherein
the intermediate layer is trained with a parameter including at least one of weight and bias based on the training data and is used for performing a computation according to a parameter in the intermediate layer.

* * * * *